US012505531B2

United States Patent
Roy et al.

(10) Patent No.: US 12,505,531 B2
(45) Date of Patent: Dec. 23, 2025

(54) SYSTEM AND METHOD OF GENERATING A MODULATION MAP FOR A SPATIAL LIGHT MODULATOR TO ILLUMINATE A TEMPLATE USED IN A PHOTOMECHANICAL SHAPING SYSTEM

(71) Applicant: CANON KABUSHIKI KAISHA, Tokyo (JP)

(72) Inventors: Nilabh K. Roy, Austin, TX (US); Mehul N. Patel, Austin, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 927 days.

(21) Appl. No.: 17/560,597

(22) Filed: Dec. 23, 2021

(65) Prior Publication Data

US 2023/0205079 A1    Jun. 29, 2023

(51) Int. Cl.

| | | |
|---|---|---|
| *G06T 7/00* | (2017.01) | |
| *B29C 35/08* | (2006.01) | |
| *B81C 1/00* | (2006.01) | |
| *B82Y 10/00* | (2011.01) | |
| *G03F 7/00* | (2006.01) | |

(52) U.S. Cl.
CPC .......... *G06T 7/001* (2013.01); *B29C 35/0805* (2013.01); *B81C 1/0046* (2013.01); *B82Y 10/00* (2013.01); *G03F 7/0002* (2013.01)

(58) Field of Classification Search
CPC ... G06T 7/001; B29C 35/0805; B81C 1/0046; B82Y 10/00; G03F 7/0002; G03F 7/70116; G03F 7/70558; G02B 26/02
See application file for complete search history.

(56) References Cited

U.S. PATENT DOCUMENTS

| | | | |
|---|---|---|---|
| 6,285,488 B1 * | 9/2001 | Sandstrom | G03F 7/704 |
| | | | 359/290 |
| 6,747,783 B1 | 6/2004 | Sandstrom | |
| 6,922,483 B2 | 7/2005 | Doane | |

(Continued)

FOREIGN PATENT DOCUMENTS

| | | | | |
|---|---|---|---|---|
| DE | 102010003608 B4 | 4/2019 | | |
| KR | 20090005884 A * | 1/2009 | ........... | G02F 1/1303 |

(Continued)

OTHER PUBLICATIONS

English translation of KR-20090005884-A by EPO. (Year: 2009).*

(Continued)

*Primary Examiner* — Xiao S Zhao
*Assistant Examiner* — Inja Song
(74) *Attorney, Agent, or Firm* — Daniel Ratoff

(57) ABSTRACT

A system and method for generating a modulation map to be supplied a spatial light modulator of a nanoimprint lithography system. Receiving a pixelated intermediate map for a spatial light modulator including a plurality of pixels based on a distortion model and a target light pattern. The pixelated intermediate map may have discontinuities. Generating a modulation map for the spatial light modulator by filling in discontinuities in the pixelated intermediate map. A first predicted light intensity map produced by the modulation map may be a closer approximation of the target light pattern than a second predicted light intensity map produced by the pixelated intermediate map.

17 Claims, 14 Drawing Sheets

(56) References Cited

U.S. PATENT DOCUMENTS

| | | |
|---|---|---|
| 6,936,194 B2 | 8/2005 | Watts |
| 7,157,036 B2 | 1/2007 | Choi et al. |
| 7,158,238 B2 | 1/2007 | Latypov et al. |
| 7,557,932 B2 | 7/2009 | Doan et al. |
| 7,889,411 B2 | 2/2011 | Latypov |
| 7,936,445 B2 | 5/2011 | Hintersteiner et al. |
| 8,066,930 B2 | 11/2011 | Sreenivasan et al. |
| 8,076,386 B2 | 12/2011 | Xu et al. |
| 8,349,241 B2 | 1/2013 | Sreenivasan et al. |
| 10,998,190 B2 | 5/2021 | Yoshida |
| 2002/0122162 A1 | 9/2002 | Nakauchi et al. |
| 2003/0107770 A1* | 6/2003 | Klatchko ............. H04N 1/4092 358/3.21 |
| 2005/0248659 A1 | 11/2005 | Kasumi et al. |
| 2008/0309884 A1* | 12/2008 | O'Dor ................. H04N 13/337 348/E13.058 |
| 2010/0096764 A1 | 4/2010 | Lu |
| 2018/0067392 A1* | 3/2018 | Murasato ............. G03F 7/0002 |
| 2018/0301331 A1 | 10/2018 | Yoshida |
| 2019/0101823 A1 | 4/2019 | Patel et al. |
| 2020/0310247 A1* | 10/2020 | Murasato ............. G03F 7/0002 |
| 2021/0124274 A1 | 4/2021 | Roy et al. |
| 2023/0053682 A1 | 2/2023 | Irving et al. |

FOREIGN PATENT DOCUMENTS

| | | |
|---|---|---|
| KR | 20210078410 A | 6/2013 |
| WO | 2015052323 A1 | 10/2014 |

OTHER PUBLICATIONS

Camera Lens Distortion—Image Engineering, retrieved Apr. 29, 2021, https://web.archive.org/web/20201020175253/ https://image-engineering.de/library/image-quality/factors/1062-distortion.

* cited by examiner

SYSTEM AND METHOD OF GENERATING A MODULATION MAP FOR A SPATIAL LIGHT MODULATOR TO ILLUMINATE A TEMPLATE USED IN A PHOTOMECHANICAL SHAPING SYSTEM

BACKGROUND OF INVENTION

Technical Field

The present disclosure relates to photomechanical shaping systems (such as a Nanoimprint Lithography system and/or an Inkjet Adaptive Planarization system). In particular, the present disclosure relates to methods of generating an illumination pattern of actinic radiation to be projected through a shaping surface that is in contact with a photopolymerizable formable material.

Description of the Related Art

Nano-fabrication includes the fabrication of very small structures that have features on the order of 100 nanometers or smaller. One application in which nano-fabrication has had a sizeable impact is in the fabrication of integrated circuits. The semiconductor processing industry continues to strive for larger production yields while increasing the circuits per unit area formed on a substrate. Improvements in nano-fabrication include providing greater process control and/or improving throughput while also allowing continued reduction of the minimum feature dimensions of the structures formed.

One nano-fabrication technique in use today is commonly referred to as nanoimprint lithography. Nanoimprint lithography is useful in a variety of applications including, for example, fabricating one or more layers of integrated devices by shaping a film on a substrate. Examples of an integrated device include but are not limited to CMOS logic, microprocessors, NAND Flash memory, NOR Flash memory, DRAM memory, MRAM, 3D cross-point memory, Re-RAM, Fe-RAM, SU-RAM, MEMS, and the like. Exemplary nanoimprint lithography systems and processes are described in detail in numerous publications, such as U.S. Pat. Nos. 8,349,241, 8,066,930, and 6,936,194, all of which are hereby incorporated by reference herein.

The nanoimprint lithography technique disclosed in each of the aforementioned patents describes the shaping of a film on a substrate by the formation of a relief pattern in a formable material (polymerizable) layer. The shape of this film may then be used to transfer a pattern corresponding to the relief pattern into and/or onto an underlying substrate.

The shaping process uses a template spaced apart from the substrate and the formable material is applied between the template and the substrate. The template is brought into contact with the formable material causing the formable material to spread and fill the space between the template and the substrate. The formable liquid is solidified to form a film that has a shape (pattern) conforming to a shape of the surface of the template that is in contact with the formable liquid. After solidification, the template is separated from the solidified layer such that the template and the substrate are spaced apart.

The substrate and the solidified layer may then be subjected to additional processes, such as etching processes, to transfer an image into the substrate that corresponds to the pattern in one or both of the solidified layer and/or patterned layers that are underneath the solidified layer. The patterned substrate can be further subjected to known steps and processes for device (article) fabrication, including, for example, curing, oxidation, layer formation, deposition, doping, planarization, etching, formable material removal, dicing, bonding, and packaging, and the like.

SUMMARY OF THE INVENTION

A first embodiment, may be a method. The method may comprise receiving a pixelated intermediate map for a spatial light modulator including a plurality of pixels based on a distortion model and a target light pattern. The pixelated intermediate map may have discontinuities. The method may further comprise generating a modulation map for the spatial light modulator by filling in discontinuities in the pixelated intermediate map. A first predicted light intensity map on an illuminated target produced by the modulation map may be a closer approximation of the target light pattern than a second predicted light intensity map on an illuminated target produced by the pixelated intermediate map. The method may further comprise controlling the spatial light modulator using the modulation map.

In an aspect of the first embodiment generating the modulation map may comprise: generating edges which describe the perimeters of the pixelated intermediate map; and filling in the area between the edges.

The first embodiment, may further comprise generating the pixelated intermediate map by: receiving the target light pattern; applying an inverse the distortion model to the target light pattern to generate an intermediate pattern; and pixelating and snapping to a grid the intermediate pattern to generate the pixelated intermediate map.

In an aspect of the first embodiment the target light pattern may be an array of values, each value in the array of values is associated with a modulation element of the spatial light modulator.

In an aspect of the first embodiment the each value in the array of values may be a binary value.

In an aspect of the first embodiment the target light pattern does not include discontinuities.

In an aspect of the first embodiment the distortion model may be:

$$f(d_1, d_2, d_3, d_4) = \begin{cases} x_a = x_d(1 + d_1 r^2 + d_2 r^4) + 2d_3 x_d y_d + d_4(r^2 + 2x_d^2) \\ y_a = y_d(1 + d_1 r^2 + d_2 r^4) + 2d_4 x_d y_d + d_3(r^2 + 2y_d^2) \\ r^2 = x_d^2 + y_d^2 \end{cases}.$$

In which $x_a$ may be an actual x-coordinate of the distortion model. In which $y_a$ may be an actual y-coordinate of the distortion model. In which $x_d$ may be a desired x-coordinate of the distortion model. In which $y_d$ may be a desired y-coordinate of the distortion model. In which $d_1$; $d_2$; $d_3$; and $d_4$ may be distortion coefficients of the distortion model.

The first embodiment, may further comprise determining a plurality of distortion coefficients of the distortion model by: measuring a test exposure pattern produced by a test modulation map produced by a spatial light modulator; and fitting the exposure pattern to the distortion model.

In an aspect of the first embodiment measuring the exposure pattern may comprise: exposing a sensor on a nanoimprint lithography tool to the test exposure pattern produced by the spatial light modulator.

In an aspect of the first embodiment measuring the exposure pattern may comprise: exposing formable material between a template and a test substrate to the test exposure pattern produced by the spatial light modulator to produce a cured film on the substrate; and measuring the cured film on the test substrate.

In an aspect of the first embodiment generating the modulation map may further comprise: identifying discontinuities in the pixelated intermediate map; and setting pixels in the pixelated intermediate map to a state which supplies actinic radiation in the identified discontinuities.

In an aspect of the first embodiment generating the modulation map may further comprise: identifying discontinuities in the pixelated intermediate map; and adding pixels to the pixelated intermediate map in the identified discontinuities.

The first embodiment, may further comprise: bringing a shaping surface into contact with formable material on a substrate; illuminating the shaping surface with the spatial light modulator based on the modulation map to form a cured film on the substrate; and separating the shaping surface from the cured film.

An embodiment, may be a method of manufacturing an article, from the substrate on the cured film that was shaped according to the first embodiment. The method of manufacturing an article may further comprise: processing the substrate with the cured film; and forming the article from the substrate with the cured film.

In an aspect of the first embodiment the target light pattern has a frame shape.

A second embodiment, may be a system comprising: a memory; and a processor. The processor may be configured to: receive a pixelated intermediate map for a spatial light modulator including a plurality of pixels based on a distortion model and a target light pattern, wherein the pixelated intermediate map has discontinuities; generate a modulation map for the spatial light modulator by filling in discontinuities in the pixelated intermediate map; and control the spatial light modulator using the modulation map. A first predicted light intensity map on an illuminated target produced by the modulation map may be a closer approximation of the target light pattern than a second predicted light intensity map on an illuminated target produced by the pixelated intermediate map.

The second embodiment, may further comprise a nanoimprint lithography system including the spatial light modulator. The nanoimprint lithography system may comprise: a substrate chuck for holding a substrate; an actinic radiation sensor that is configured to supply information that is used by the processor to generate the pixelated intermediate map; a substrate stage for holding the substrate chuck and the actinic radiation sensor; a template chuck for holding a template; and a curing system including the spatial light modulator, wherein the spatial light modulator is configured to illuminate formable material in contact with both the substrate and the template.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE FIGURES

So that features and advantages of the present invention can be understood in detail, a more particular description of embodiments of the invention may be had by reference to the embodiments illustrated in the appended drawings. It is to be noted, however, that the appended drawings only illustrate typical embodiments of the invention and are therefore not to be considered limiting of its scope, for the invention may admit to other equally effective embodiments.

Figure 1:
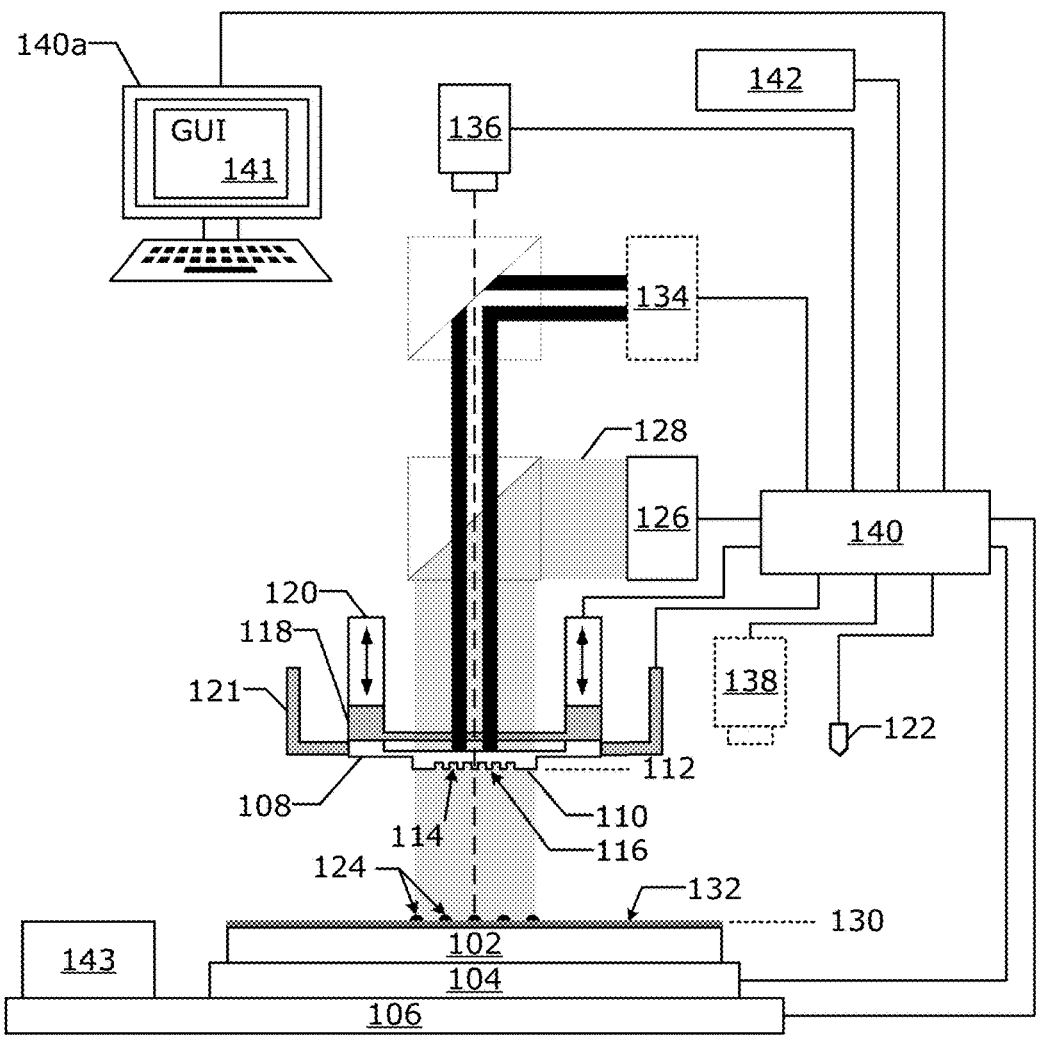
FIG. 1 is an illustration of an exemplary nanoimprint lithography system having a template with a mesa spaced apart from a substrate as used in an embodiment.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

It should be noted that the following embodiments are not intended to limit the scope of the appended claims. A plurality of features are described in the embodiments. However, not all the combinations of the plurality of features are necessarily essential to the present invention, and the plurality of features may arbitrarily be combined. The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference to "one embodiment", "certain embodiments", "an embodiment", "an implementation", "an example", "alternative embodiment", or similar terms means that a particular feature, structure, element, or characteristic described in connection with the embodiment is included in at least one embodiment. Thus, the appearances of such phrases or in various places throughout are not necessarily all referring to the same embodiment. Furthermore, the particular features, structures, or characteristics may be combined in any suitable manner in one or more embodiments without limitation, unless otherwise stated.

DETAILED DESCRIPTION

The nanoimprinting lithography technique can be used to shape a film on a substrate from a formable material. The shaping process may include bringing a template into contact with the formable material. The template may include a shaping surface on a mesa that extends above a recessed surface. The template also includes mesa sidewalls that surround the mesa and connect the mesa to the recessed surface. During the shaping process the formable material spreads due to capillary action and other forces such that the formable material spreads toward the mesa sidewalls. Extrusion defects can form when formable material wets the mesa sidewalls during the shaping process. After the formable material is exposed to actinic radiation, and the template separates from the formable material, one or more extrusion defects may stay on the substrate and/or template.

The applicant has found that it is possible to reduce the occurrence of these defects if the dosage of the actinic radiation in the regions of these defects is carefully controlled. These defects tend to occur near the mesa sidewalls. The applicant has found that it is helpful to use a frame curing process to cure, gel, and/or help cure the areas near the mesa sidewall with a carefully controlled dosage of actinic radiation with a frame like pattern of actinic radiation that is aligned relative to the mesa sidewalls. One method of producing the frame like illumination pattern is to use a spatial light modulator with a plurality of modulation elements. The applicant has found that there can be some variation in the size, shape, and position of the mesa this needs to be taken into account when generating the instructions for the spatial light modulator to generate a frame like illumination pattern. Taking this variation into account may include doing multiple iterative experiments that are time and resource intensive.

Specific constraints of the specific spatial light modulator and specific optical system used in the frame curing process places limitations on the adjustability of the distribution of actinic radiation at the imprint plane. What is needed is a means for overcoming these constraints and minimize the occurrence of both extrusion defects, under-cure defects, and non-fill defects.

Nanoimprint System (Shaping System)

FIG. 1 is an illustration of a nanoimprint lithography system 100 in which an embodiment may be implemented. The nanoimprint lithography system 100 is used to produce an imprinted (shaped) film on a substrate 102. The substrate 102 may be coupled to a substrate chuck 104. The substrate chuck 104 may be but is not limited to a vacuum chuck, pin-type chuck, groove-type chuck, electrostatic chuck, electromagnetic chuck, and/or the like.

The substrate 102 and the substrate chuck 104 may be further supported by a substrate positioning stage 106. The substrate positioning stage 106 may provide translational and/or rotational motion along one or more of the x, y, z, θ, ψ, and φ-axes. The substrate positioning stage 106, the substrate 102, and the substrate chuck 104 may also be positioned on a base (not shown). The substrate positioning stage may be a part of a positioning system.

Spaced-apart from the substrate 102 is a template 108. The template 108 may include a body having a mesa (also referred to as a mold) 110 extending towards the substrate 102 on a front side of the template 108. The mesa 110 may have a patterning surface 112 thereon also on the front side of the template 108. The patterning surface 112, also known as a shaping surface, is the surface of the template that shapes the formable material 124. In an embodiment, the patterning surface 112 is planar and is used to planarize the formable material. Alternatively, the template 108 may be formed without the mesa 110, in which case the surface of the template facing the substrate 102 is equivalent to the mold 110 and the patterning surface 112 is that surface of the template 108 facing the substrate 102.

The template 108 may be formed from such materials including, but not limited to, fused-silica, quartz, silicon, organic polymers, siloxane polymers, borosilicate glass, fluorocarbon polymers, metal, hardened sapphire, and/or the like. The patterning surface 112 may have features defined by a plurality of spaced-apart template recesses 114 and/or template protrusions 116. The patterning surface 112 defines a pattern that forms the basis of a pattern to be formed on the substrate 102. In an alternative embodiment, the patterning surface 112 is featureless in which case a planar surface is formed on the substrate. In an alternative embodiment, the patterning surface 112 is featureless and the same size as the substrate and a planar surface is formed across the entire substrate.

Template 108 may be coupled to a template chuck 118. The template chuck 118 may be, but is not limited to, vacuum chuck, pin-type chuck, groove-type chuck, electrostatic chuck, electromagnetic chuck, and/or other similar chuck types. The template chuck 118 may be configured to apply stress, pressure, and/or strain to template 108 that varies across the template 108. The template chuck 118 may include piezoelectric actuators which can squeeze and/or stretch different portions of the template 108. The template chuck 118 may include a system such as a zone based vacuum chuck, an actuator array, a pressure bladder, etc. which can apply a pressure differential to a back surface of the template causing the template to bend and deform.

The template chuck 118 may be coupled to an imprint head 120 which is a part of the positioning system. The imprint head may be moveably coupled to a bridge. The imprint head 120 may include one or more actuators such as voice coil motors, piezoelectric motors, linear motor, nut and screw motor, etc., which are configured to move the template chuck 118 relative to the substrate in at least the z-axis direction, and potentially other directions (for example x, y, θ, ψ, and φ-axes).

The nanoimprint lithography system 100 may further comprise a fluid dispenser 122. The fluid dispenser 122 may also be moveably coupled to the bridge. In an embodiment, the fluid dispenser 122 and the imprint head 120 share one or more or all positioning components. In an alternative embodiment, the fluid dispenser 122 and the imprint head 120 move independently from each other. The fluid dispenser 122 may be used to deposit liquid formable material 124 (for example: a mixture that includes a polymerizable material; a liquid material that can be solidified or gelled by being exposed to actinic radiation) onto the substrate 102 in a pattern. Additional formable material 124 may also be added to the substrate 102 using techniques, such as, drop dispense, spin-coating, dip coating, chemical vapor deposition (CVD), physical vapor deposition (PVD), thin film deposition, thick film deposition, and/or the like prior to the formable material 124 being deposited onto the substrate 102. The formable material 124 may be dispensed upon the substrate 102 before and/or after a desired volume is defined between the mold 112 and the substrate 102 depending on design considerations. The formable material 124 may comprise a mixture including a monomer as described in U.S. Pat. Nos. 7,157,036 and 8,076,386, both of which are herein incorporated by reference.

Different fluid dispensers 122 may use different technologies to dispense formable material 124. When the formable material 124 is jettable, ink jet type dispensers may be used to dispense the formable material. For example, thermal ink jetting, microelectromechanical systems (MEMS) based ink jetting, valve jet, and piezoelectric ink jetting are common techniques for dispensing jettable liquids.

The nanoimprint lithography system 100 may further comprise a curing system that includes at least a radiation source 126 that directs actinic energy along an exposure path 128. The imprint head and the substrate positioning stage 106 may be configured to position the template 108 and the substrate 102 in superimposition with the exposure path 128. The radiation source 126 sends the actinic energy along the exposure path 128 after the template 108 has contacted the formable material 128. FIG. 1 illustrates the exposure path 128 when the template 108 is not in contact with the formable material 124, this is done for illustrative purposes so that the relative position of the individual components can be easily identified. An individual skilled in the art would understand that exposure path 128 would not substantially change when the template 108 is brought into contact with the formable material 124.

The nanoimprint lithography system 100 may further comprise a field camera 136 that is positioned to view the spread of formable material 124 after the template 108 has made contact with the formable material 124. FIG. 1 illustrates an optical axis of the field camera's imaging field as a dashed line. As illustrated in FIG. 1 the nanoimprint lithography system 100 may include one or more optical components (dichroic mirrors, beam combiners, prisms, lenses, mirrors, etc.) which combine the actinic radiation with light to be detected by the field camera. The field camera 136 may be configured to detect the spread of formable material under the template 108. The optical axis of the field camera 136 as illustrated in FIG. 1 is straight but may be bent by one or more optical components. The field camera 136 may include one or more of a CCD, a sensor array, a line camera, and a photodetector which are configured to gather light that has a wavelength that shows a contrast between regions underneath the template 108 that are in contact with the formable material, and regions underneath the template 108 which are not in contact with the formable material 124. The field camera 136 may be configured to gather monochromatic images of visible light. The field camera 136 may be configured to provide images of the spread of formable material 124 underneath the template 108; the separation of the template 108 from cured formable material; and can be used to keep track of the imprinting process. The field camera 136 may also be configured to measure interference fringes, which change as the formable material spreads 124 between the gap between the patterning surface 112 and the substrate surface 130.

The nanoimprint lithography system 100 may further comprise a droplet inspection system 138 that is separate from the field camera 136. The droplet inspection system 138 may include one or more of a CCD, a camera, a line camera, and a photodetector. The droplet inspection system 138 may include one or more optical components such as lenses, mirrors, apertures, filters, prisms, polarizers, windows, adaptive optics, and/or light sources. The droplet inspection system 138 may be positioned to inspect droplets prior to the patterning surface 112 contacting the formable material 124 on the substrate 102.

The nanoimprint lithography system 100 may further include a thermal radiation source 134 which may be configured to provide a spatial distribution of thermal radiation to one or both of the template 108 and the substrate 102. The thermal radiation source 134 may include one or more sources of thermal electromagnetic radiation that will heat up one or both of the substrate 102 and the template 108 and does not cause the formable material 124 to solidify. The thermal radiation source 134 may include a spatial light modulator such as a digital micromirror device (DMD), Liquid Crystal on Silicon (LCoS), Liquid Crystal Device (LCD), etc., to modulate the spatio-temporal distribution of thermal radiation. The nanoimprint lithography system may further comprise one or more optical components which are used to combine the actinic radiation, the thermal radiation, and the radiation gathered by the field camera 136 onto a single optical path that intersects with the imprint field when the template 108 comes into contact with the formable material 124 on the substrate 102. The thermal radiation source 134 may send the thermal radiation along a thermal radiation path (which in FIG. 1 is illustrated as 2 thick dark lines) after the template 108 has contacted the formable material 128. FIG. 1 illustrates the thermal radiation path when the template 108 is not in contact with the formable material 124, this is done for illustrative purposes so that the relative position of the individual components can be easily identified. An individual skilled in the art would understand that the thermal radiation path would not substantially change when the template 108 is brought into contact with the formable material 124. In FIG. 1 the thermal radiation path is shown terminating at the template 108, but it may also terminate at the substrate 102. In an alternative embodiment, the thermal radiation source 134 is underneath the substrate 102, and thermal radiation path is not combined with the actinic radiation and the visible light.

Prior to the formable material 124 being dispensed onto the substrate, a substrate coating 132 may be applied to the substrate 102. In an embodiment, the substrate coating 132 may be an adhesion layer. In an embodiment, the substrate coating 132 may be applied to the substrate 102 prior to the substrate being loaded onto the substrate chuck 104. In an alternative embodiment, the substrate coating 132 may be applied to substrate 102 while the substrate 102 is on the substrate chuck 104. In an embodiment, the substrate coating 132 may be applied by spin coating, dip coating, etc. In an embodiment, the substrate 102 may be a semiconductor wafer. In another embodiment, the substrate 102 may be a blank template (replica blank) that may be used to create a daughter template after being imprinted.

The nanoimprint lithography system 100 may include an imprint field atmosphere control system such as gas and/or vacuum system, an example of which is described in U.S. Patent Publication Nos. 2010/0096764 and 2019/0101823 which are hereby incorporated by reference. The gas and/or vacuum system may include one or more of pumps, valves, solenoids, gas sources, gas tubing, etc. which are configured to cause one or more different gases to flow at different times and different regions. The gas and/or vacuum system 36 may be connected to a first gas transport system that transports gas to and from the edge of the substrate 102 and controls the imprint field atmosphere by controlling the flow of gas at the edge of the substrate 102. The gas and/or vacuum system may be connected to a second gas transport system that transports gas to and from the edge of the template 108 and controls the imprint field atmosphere by controlling the flow of gas at the edge of the template 108. The gas and/or vacuum system may be connected to a third gas transport system that transports gas to and from the top of the template 108 and controls the imprint field atmosphere by controlling the flow of gas through the template 108. One or more of the first, second, and third gas transport systems may be used in combination or separately to control the flow of gas in and around the imprint field.

The nanoimprint lithography system 100 may be regulated, controlled, and/or directed by one or more processors 140 (controller) in communication with one or more components and/or subsystems such as the substrate chuck 104, the substrate positioning stage 106, the template chuck 118, the imprint head 120, the fluid dispenser 122, the radiation source 126, the thermal radiation source 134, the field camera 136, imprint field atmosphere control system, and/or the droplet inspection system 138. The processor 140 may operate based on instructions in a computer readable program stored in a non-transitory computer readable memory 142. The processor 140 may be or include one or more of a CPU, MPU, GPU, ASIC, FPGA, DSP, and a general-purpose computer. The processor 140 may be a purpose-built controller or may be a general-purpose computing device that is adapted to be a controller. Examples of a non-transitory computer readable memory include but are not limited to RAM, ROM, CD, DVD, Blu-Ray, hard drive, networked attached storage (NAS), an intranet connected non-transitory computer readable storage device, and an internet connected non-transitory computer readable storage device.

Either the imprint head 120, the substrate positioning stage 106, or both varies a distance between the mold 110 and the substrate 102 to define a desired space (a bounded physical extent in three dimensions) that is filled with the formable material 124. For example, the imprint head 120 may apply a force to the template 108 such that mold 110 is in contact with the formable material 124. After the desired volume is filled with the formable material 124, the radiation source 126 produces actinic radiation (for example, UV, 248 nm, 280 nm, 350 nm, 365 nm, 395 nm, 400 nm, 405 nm, 435 nm, etc.) causing formable material 124 to cure, solidify, and/or cross-link; conforming to a shape of the substrate surface 130 and the patterning surface 112, defining a patterned layer on the substrate 102. The formable material 124 is cured while the template 108 is in contact with formable material 124, forming the patterned layer on the substrate 102. Thus, the nanoimprint lithography system 100 uses an imprinting process to form the patterned layer which has recesses and protrusions which are an inverse of the pattern in the patterning surface 112. In an alternative embodiment, the nanoimprint lithography system 100 uses an imprinting process to form a planar layer with a featureless patterning surface 112.

The imprinting process may be done repeatedly in a plurality of imprint fields (also known as just fields or shots) that are spread across the substrate surface 130. Each of the imprint fields may be the same size as the mesa 110 or just the pattern area of the mesa 110. The pattern area of the mesa 110 is a region of the patterning surface 112 which is used to imprint patterns on a substrate 102 which are features of the device or are then used in subsequent processes to form features of the device. The pattern area of the mesa 110 may or may not include mass velocity variation features (fluid control features) which are used to prevent extrusions from forming on imprint field edges. In an alternative embodiment, the substrate 102 has only one imprint field which is the same size as the substrate 102 or the area of the substrate 102 which is to be patterned with the mesa 110. In an alternative embodiment, the imprint fields overlap. Some of the imprint fields may be partial imprint fields which intersect with a boundary of the substrate 102.

The patterned layer may be formed such that it has a residual layer having a residual layer thickness (RLT) that is a minimum thickness of formable material 124 between the substrate surface 130 and the patterning surface 112 in each imprint field. The patterned layer may also include one or more features such as protrusions which extend above the residual layer having a thickness. These protrusions match the recesses 114 in the mesa 110.

Template

Figure 2A:
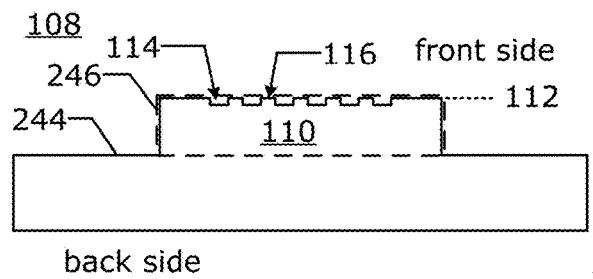
FIGS. 2A-B are illustrations of an exemplary template that may be used in an embodiment.
Figure 2B:
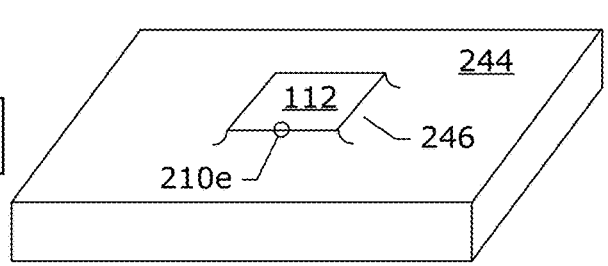

FIG. 2 is an illustration of a template 108 that may be used in an embodiment. The patterning surface 112 may be on a mesa 110 (identified by the dashed box in FIG. 2). The mesa 110 is surrounded by a recessed surface 244 on the front side of the template. Mesa sidewalls 246 connect the recessed surface 244 to patterning surface 112 of the mesa 110. The mesa sidewalls 246 surround the mesa 110. In an embodiment in which the mesa is round or has rounded corners, the mesa sidewalls 246 refers to a single mesa sidewall that is a continuous wall without corners.

Imprinting Process

Figure 3:
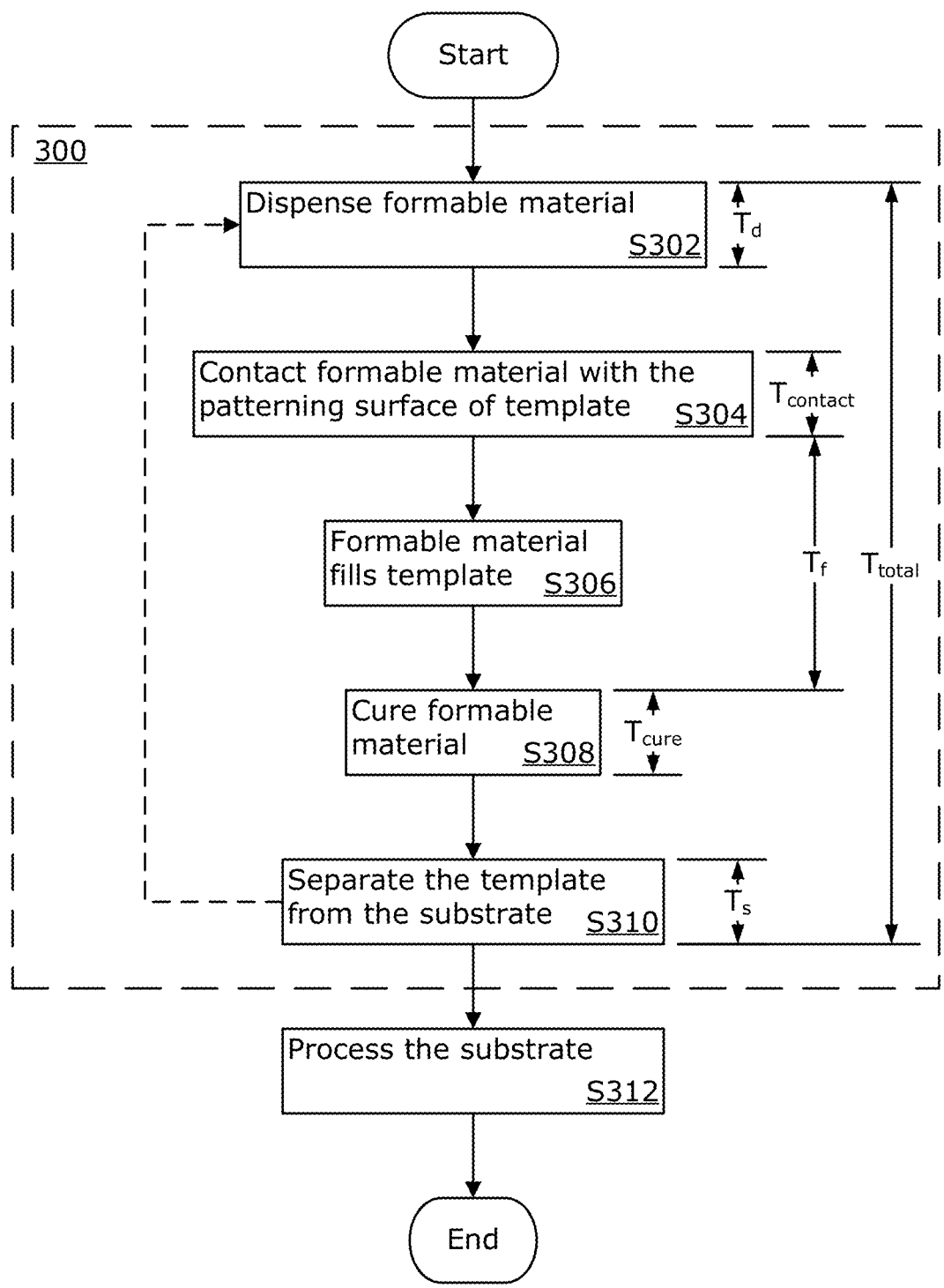
FIG. 3 is a flowchart illustrating an exemplary imprinting method as used in an embodiment.

FIG. 3 is a flowchart of a method of manufacturing an article (device) that includes an imprinting process 300 by the nanoimprint lithography system 100 that can be used to form patterns in formable material 124 on one or more imprint fields (also referred to as: pattern areas or shot areas). The imprinting process 300 may be performed repeatedly on a plurality of substrates 102 by the nanoimprint lithography system 100. The processor 140 may be used to control the imprinting process 300.

In an alternative embodiment, the imprinting process 300 is used to planarize the substrate 102. In which case, the patterning surface 112 is featureless and may also be the same size or larger than the substrate 102.

The beginning of the imprinting process 300 may include a template mounting step causing a template conveyance mechanism to mount a template 108 onto the template chuck 118. The imprinting process may also include a substrate mounting step, the processor 140 may cause a substrate conveyance mechanism to mount the substrate 102 onto the substrate chuck 104. The substrate may have one or more coatings and/or structures. The order in which the template 108 and the substrate 102 are mounted onto the nanoimprint lithography system 100 is not particularly limited, and the template 108 and the substrate 102 may be mounted sequentially or simultaneously.

In a positioning step, the processor 140 may cause one or both of the substrate positioning stage 106 and/or a dispenser positioning stage to move an imprinting field i (index i may be initially set to 1) of the substrate 102 to a fluid dispense position below the fluid dispenser 122. The substrate 102, may be divided into N imprinting fields, wherein each imprinting field is identified by an index i. In which N is a real integer such as 1, 10, 75, etc. $\{N \in \mathbb{Z}^+\}$. In a dispensing step S302, the processor 140 may cause the fluid dispenser 122 to dispense formable material onto an imprinting field i. In an embodiment, the fluid dispenser 122 dispenses the formable material 124 as a plurality of droplets. The fluid dispenser 122 may include one nozzle or multiple nozzles. The fluid dispenser 122 may eject formable material 124 from the one or more nozzles simultaneously. The imprint field i may be moved relative to the fluid dispenser 122 while the fluid dispenser is ejecting formable material 124. Thus, the time at which some of the droplets land on the substrate may vary across the imprint field i. In an embodiment, during the dispensing step S302, the formable material 124 may be dispensed onto a substrate in accordance with a drop pattern. The drop pattern may include information such as one or more of position to deposit drops of formable material, the volume of the drops of formable material, type of formable material, shape parameters of the drops of formable material, etc. In an embodiment, the drop pattern may include only the volumes of the drops to be dispensed and the location of where to deposit the droplets.

After, the droplets are dispensed, then a contacting step S304 may be initiated, the processor 140 may cause one or both of the substrate positioning stage 106 and a template positioning stage to bring the patterning surface 112 of the template 108 into contact with the formable material 124 in imprint field i.

During a spreading step S306, the formable material 124 then spreads out towards the edge of the imprint field i and the mesa sidewalls 246. The edge of the imprint field may be defined by the mesa sidewalls 246. How the formable material 124 spreads and fills the mesa can be observed via the field camera 136 and may be used to track a progress of a fluid front of formable material.

In a curing step S308, the processor 140 may send instructions to the radiation source 126 to send a curing illumination pattern of actinic radiation through the template 108, the mesa 110 and the patterning surface 112. The curing illumination pattern provides enough energy to cure (polymerize) the formable material 124 under the patterning surface 112.

In a separation step S310, the processor 140 uses one or more of the substrate chuck 104, the substrate positioning stage 106, template chuck 118, and the imprint head 120 to separate the patterning surface 112 of the template 108 from the cured formable material on the substrate 102. If there are additional imprint fields to be imprinted, then the process moves back to step S302.

In an embodiment, after the imprinting process 300 is finished additional semiconductor manufacturing processing is performed on the substrate 102 in a processing step S312 so as to create an article of manufacture (for example a semiconductor device). In an embodiment, each imprint field includes a plurality of devices.

The further semiconductor manufacturing processing in processing step S312 may include etching processes to transfer a relief image into the substrate that corresponds to the pattern in the patterned layer or an inverse of that pattern. The further processing in processing step S312 may also include known steps and processes for article fabrication, including, for example, inspection, curing, oxidation, layer formation, deposition, doping, planarization, etching, formable material removal, dicing, bonding, packaging, and the like. The substrate 102 may be processed to produce a plurality of articles (devices).

Imprinting System with a Spatial Light Modulator

Figure 4A:
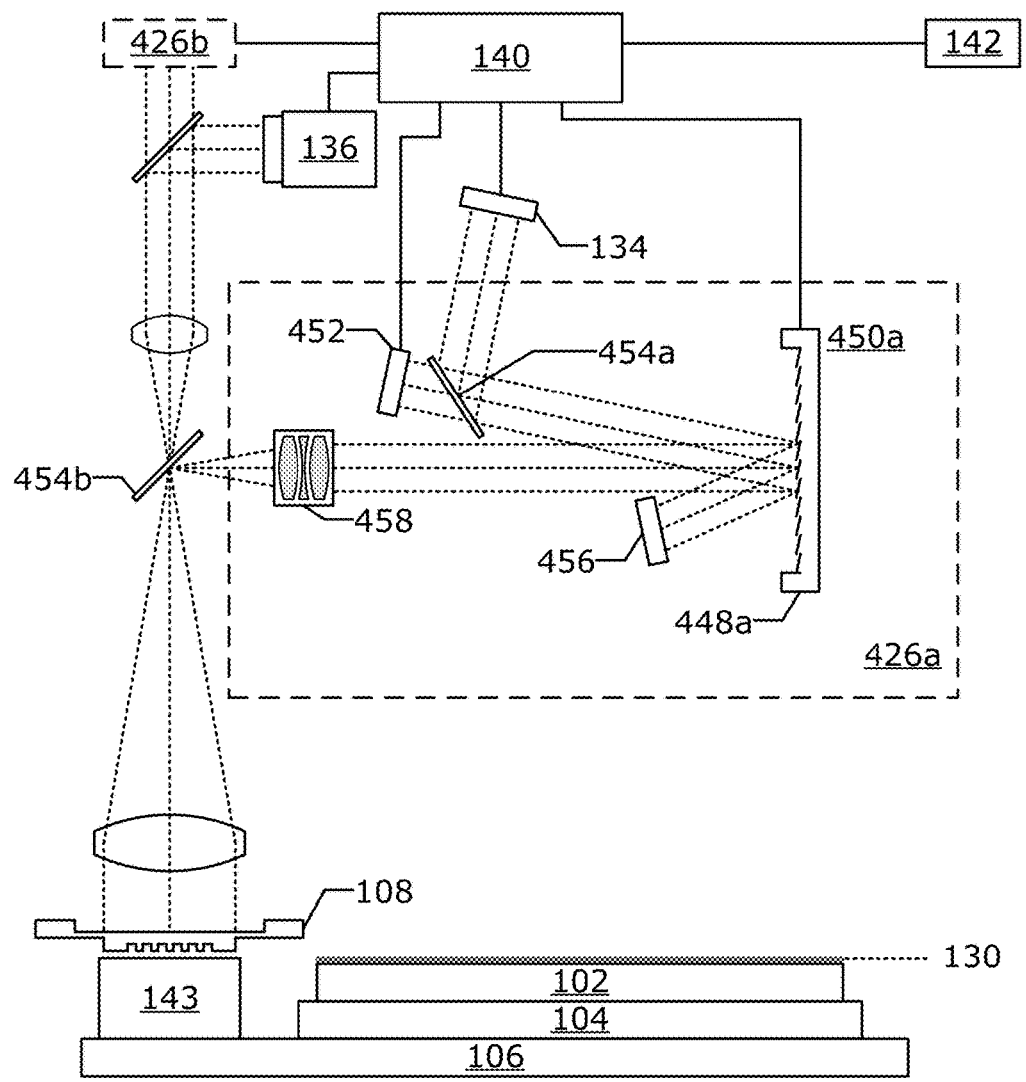
FIG. 4A is an illustration of particular components of an exemplary imprinting system as used in embodiments.

FIG. 4A is an illustration of a nanoimprint lithography system 400a that is substantially similar to the nanoimprint lithography system 100 illustrated in FIG. 1 in which a spatial light modulator (SLM) 448 is explicitly shown as a DMD 448a. The order, arrangement, and use of optical components such as light sources, beam splitters, lenses, and mirrors as illustrated in FIG. 4A are exemplary and other arrangements of optical components can be used to carry out an embodiment.

The nanoimprint lithography system 400a may include a first source of actinic radiation 426a. The first source of actinic radiation 426a may include an actinic illumination device 450 such as a laser, LED, or a lamp. The actinic illumination device 450 is positioned to illuminate the SLM 448 such as a DMD 448a in FIG. 4A. One or more optical components may be arranged to guide the actinic radiation to the spatial light modulator. The first source of actinic radiation 426a may receive one or more signals from the processor 140 with instructions on when and how much actinic radiation to provide.

The SLM 448 may be a digital micromirror device (DMD), Liquid Crystal on Silicon (LCoS), Liquid Crystal Device (LCD), spatial light valve, mirror array, MOEMS, diffractive MEMS, etc., to modulate the spatio-temporal distribution of actinic radiation from the first actinic radiation source 426a. The SLM 448 may also be configured to irradiate one or more of the substrate 102, the template 108, and/or the formable material 124 with radiation from a thermal radiation source 134. A beam combiner 452a may be used to combine actinic radiation the actinic illumination device 450 and the thermal radiation source 134. One or more optical components 456 may be used to guide radiation from the spatial light modulator to formable material 124 under the template 108.

The SLM 448 may include a plurality of pixels tessellated across the SLM 448. Each pixel may be individually addressable in both space and time. The processor 140 may be configured to send a first set of signals to the SLM 448 based on a map of modulation values received from the memory 142. In response to the first set of signals the SLM 448 will change the state of individual pixels in the spatial light modulator. In an embodiment, the map is information indicating on/off status of each pixel of the SLM 448 (DMD, LCD). In an embodiment, the map is information indicating the status of each pixel of the SLM 448 (DMD, LCD). In which the status includes one or more of: on/off status; on/off status duration; amount reflected (for reflective LCD); amount transmitted (for transmitted LCD).

In the case in which the spatial light modulator is a DMD 448a changing the state of a pixel means moving a micromirror from a first angle to a second angle. In the case in which the SLM 448 is a transmissive spatial light modulator, such as an LCD or a spatial light valve, changing the state of a pixel means changing the transmissivity of the pixel. Changing the transmissivity may include changing the state of a polarization retarder (for example a liquid crystal). The polarization retarder may include or be optically coupled to a polarizer which blocks some portion of the light. In the case in which the SLM 448 is a reflective spatial light modulator, such as an LCoS, changing the state of a pixel means changing the reflectivity of the pixel. Changing the reflectivity may include changing the state of a polarization retarder (for example a liquid crystal) on a reflective surface. The polarization retarder may include or be optically coupled to a polarizer which blocks some portion of the light.

FIG. 4A is an illustration of an embodiment 400a in which the spatial light modulator is a DMD 448a. Individual mirrors (pixels) on the spatial light modulator may be in a first state that guides the actinic radiation towards the template or in a second state that guides the actinic radiation away from the template for example towards a beam dump 454.

Figure 4B:
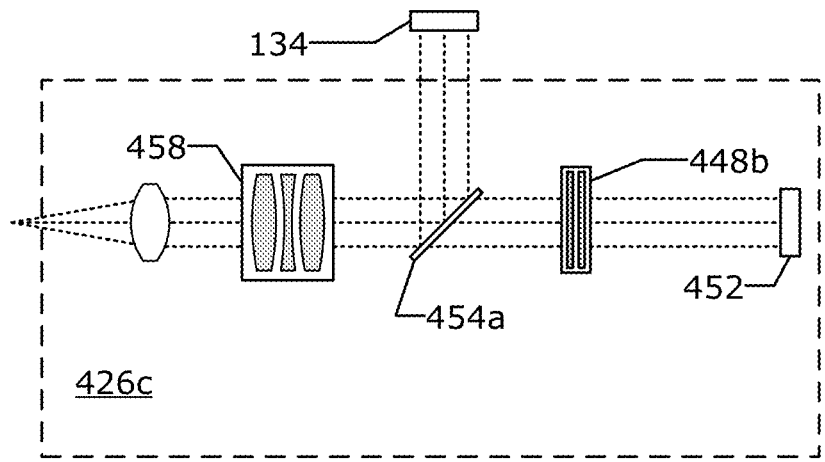
FIGS. 4B-D are illustrations of alternative sources of actinic radiation as used in embodiments.

FIG. 4B is an illustration of an embodiment 400b with a second alternative first source of actinic radiation 426c in which the spatial light modulator is a transmissive spatial light modulator 448b such as an LCD. The transmissive spatial light modulator 448b may include a spatio-temporally addressable liquid crystal polarization retarder and a polarizer. The transmissive spatial light modulator 448b may include MEMS based spatio-temporally addressable light valves.

Figure 4C:
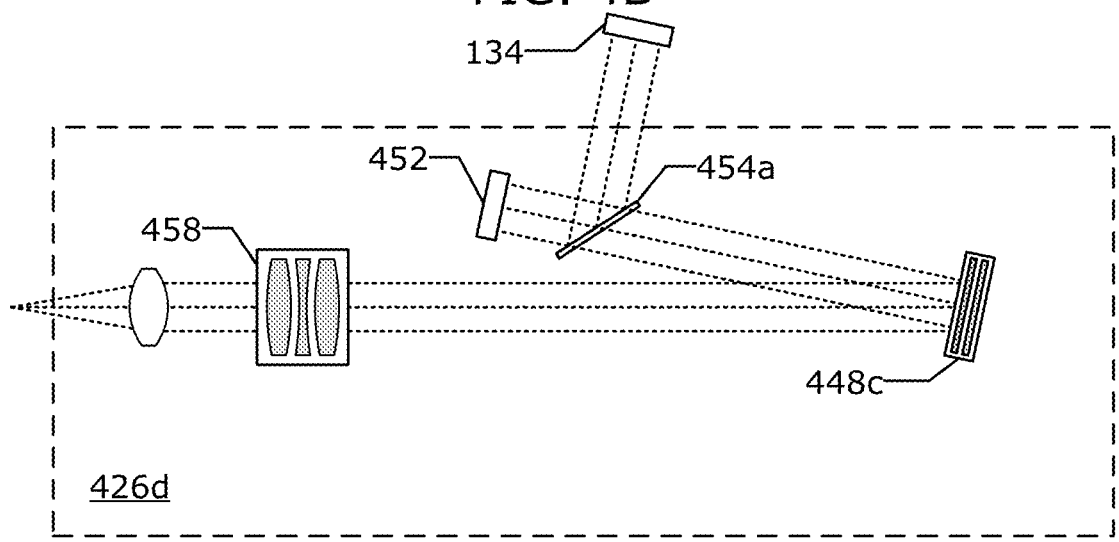

FIG. 4C is an illustration of an embodiment 400c with a second alternative second source of actinic radiation 426d in which the spatial light modulator is a reflective spatial intensity modulator 448c such as a LCoS device. The reflective spatial light modulator 448c may include a spatio-temporally addressable liquid crystal polarization retarder, a polarizer, and a reflective surface such as silicon. The reflective spatial intensity modulator 448c may include a MEMS based spatio-temporally addressable reflective surface.

The SLM 448 is positioned to illuminate the formable material 124 under the template 108 with actinic radiation spatio-temporal distribution of energy (J/m$^2$) in accordance with signals received from the processor 140 which are representative of a map of modulation values (for example intensity and/or duty cycles). The actinic radiation cures or helps cure the formable material 124 under the template 108. An embodiment may include one or more optical components such as lenses, mirror, apertures, etc. which guide the radiation from the SLM 448 to the formable material 124. An embodiment may include one or more optical components which help match the shape of the active area of the SLM 448 to the shape of the mesa 110. An embodiment may include one or more optical components which adjust the position of the focal plane of the actinic radiation from the spatial light modulator relative to formable material 124.

Figure 4D:
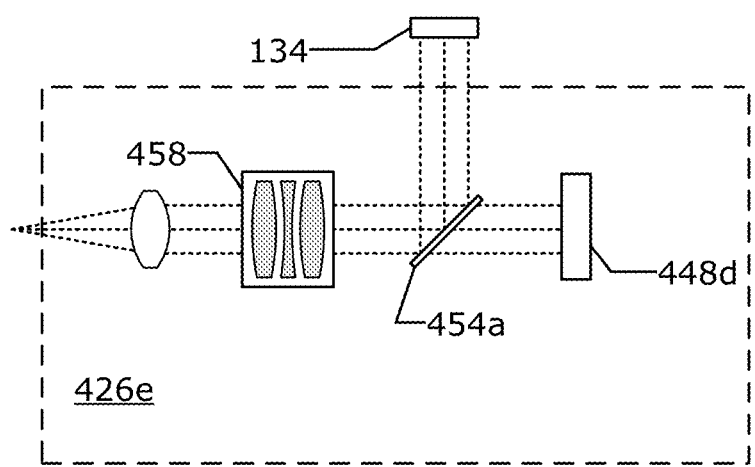
Figure 5:
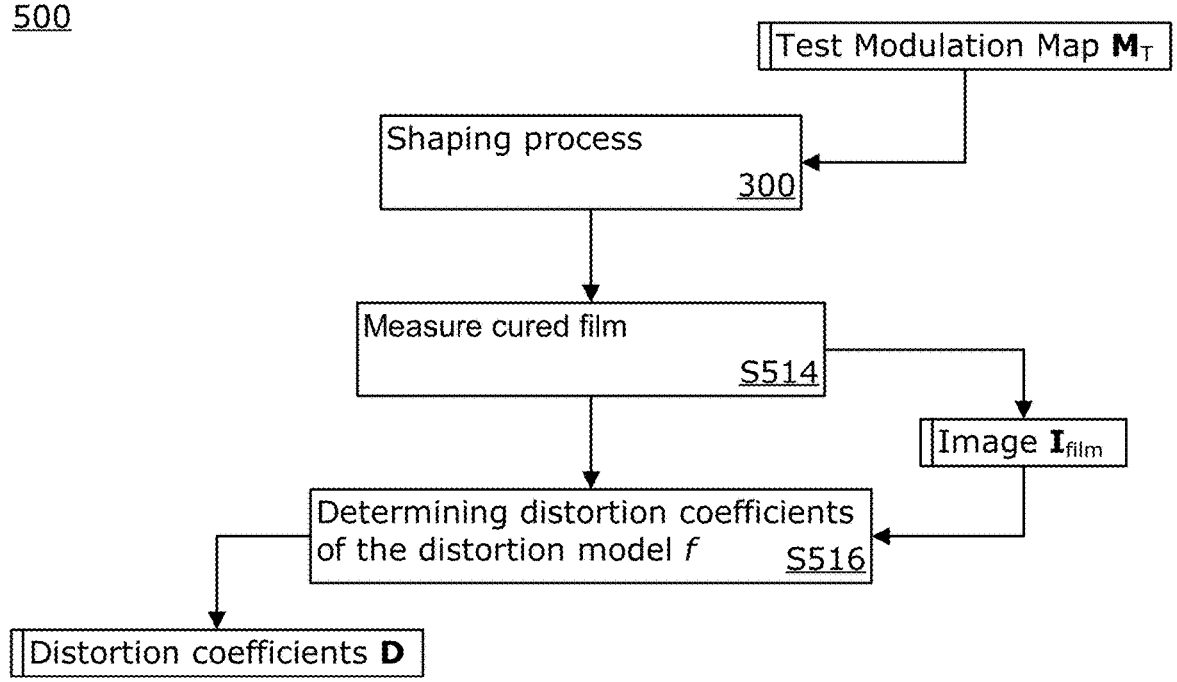
FIG. 5 is a flowchart illustrating an exemplary method of determining distortion coefficients as used in embodiments.
Figure 6:
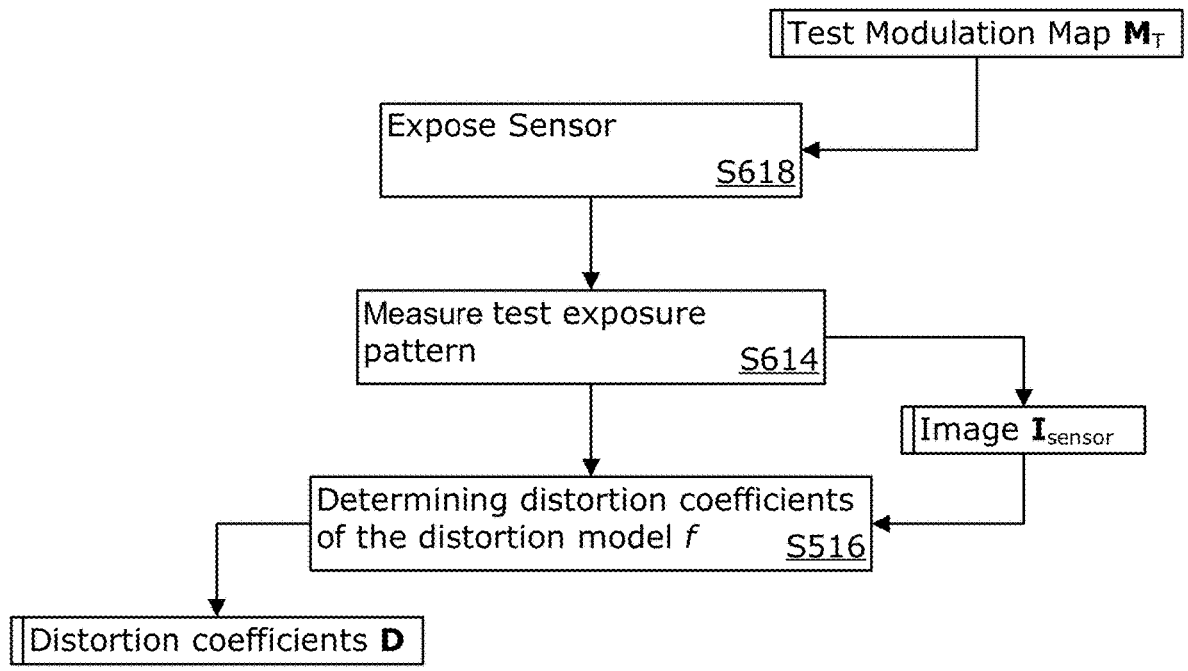
FIG. 6 is a flowchart illustrating an exemplary method of determining distortion coefficients as used in embodiments.

FIG. 4D is an illustration of an embodiment 400d with a fourth alternative first source of actinic radiation 426e that does not include an actinic illumination device 450 that is modulated by a spatial light modulator, instead the spatial light modulator 448d is an array of actinic radiation sources, for example an LED array. In which each element in the array of actinic radiation sources is addressable. Each element in the in the array of actinic radiation sources may be a laser, LED, or a lamp.

An embodiment, may include a second source of actinic radiation source 426b which has not been guided by the spatial light modulator to the plane of the formable material 124. Actinic radiation from the second source actinic radiation source 426b is guided by one or more other optical components to the formable material 124. The second source of actinic radiation source 426b may have the same or different wavelength from the first actinic radiation source 426a. An embodiment may include one or more beam combiners 452b (such as prisms, half silvered mirrors, dichroic filters, etc.) which combine light from the SLM 448 and the second source of actinic radiation 426b. In an embodiment, actinic radiation from each of the radiation sources may be directed at the formable material 124 from a different angle.

In an embodiment, the second source of actinic radiation 426b is configured to illuminate a central portion of the patterning surface 112 and the first source of actinic radiation 426a is configured illuminate the outer edges of the patterning surface 112 near the mesa sidewalls 246.

An embodiment, may include a field camera 136 which monitors the formable material under the template 108 and may control the timing of the illumination of the formable material 124 with actinic radiation.

Method of Generating a Modulation Map for the Spatial Light Modulator

The applicant has found that minimizing the number of defects (for example extrusion defects) using the shaping process 300 requires that during the curing step 308 an illumination pattern of actinic radiation that is used for curing the formable material 124 inside an imprint field is precise. For example, the illumination pattern may have micrometer scale precision. One method of providing a precise illumination pattern that is also adjustable along the imprint field edge is to use a SLM 448 so that any desired illumination pattern can be transferred from the SLM 448 to the formable material 124 with a granularity of a single pixel. The applicant has found that the modulation elements of the SLM 448 can be registered with specific locations in the imprint field relative to the mesa sidewalls 246 with for example less than 10 μm precision. This registration is useful for accurately identifying the modulation elements corresponding to the locations around the imprint field edges. This registration may also be useful for the interior locations within the imprint field. The registration errors may be impacted by: optical system distortions; position variation of the mesa 110, which can vary by several micrometers from template to template; tool to tool variations; and variation over time. The SLM 448 is also used for a spatially adjusted heating of the substrate during the imprinting process, the optical system may be optimized for this use of adjusted heating of the substrate and not optimized for illumination of the imprint field with a frame like illumination pattern.

The method of generating the modulation map for the spatial light modulator may include the use of measurements from an actinic radiation sensor 143 to create a distortion model f. The distortion model f may then be used as part of the process of generating the modulation map.

Registering the modulation elements of the SLM 448 may include a testing process 500. The testing process 500 may include using the shaping process 300 with a test modulation map $M_T$ to form a test film. In an embodiment, the test modulation map $M_T$ is a binary array of values, wherein each element in the array is representative of the desired state of each modulation element of the SLM 448. The test process 500 may include a measuring step S514 of measuring the test film with a metrology tool to produce an image $I_{film}$ of the cured film. The metrology tool may be a microscope outside of the shaping system 100 or a microscope on the shaping system 100. The test process 500 may include coefficient determination step S516 in which a set of distortion coefficients D of a distortion model f are determined based on the measurements of the test film.

Figure 7A:
FIG. 7A is a test modulation map as used in an exemplary embodiment.

An alternative embodiment may include a determining coefficients process 600. The determining coefficients process 600 may include an exposure step S618 to measure a test exposure pattern produced by a spatial light modulator that is driven by a test modulation map $M_T$. The exposure step S618 may include having the processor 140 send positioning information to the substrate positioning stage 106 to move the actinic radiation sensor 143 under the mesa 110. The exposure step S618 may include having the processor 140 sending the test modulation map $M_T$ to the spatial light modulator 448. FIG. 7A is an exemplary test modulation map $M_T$.

Figure 7B:
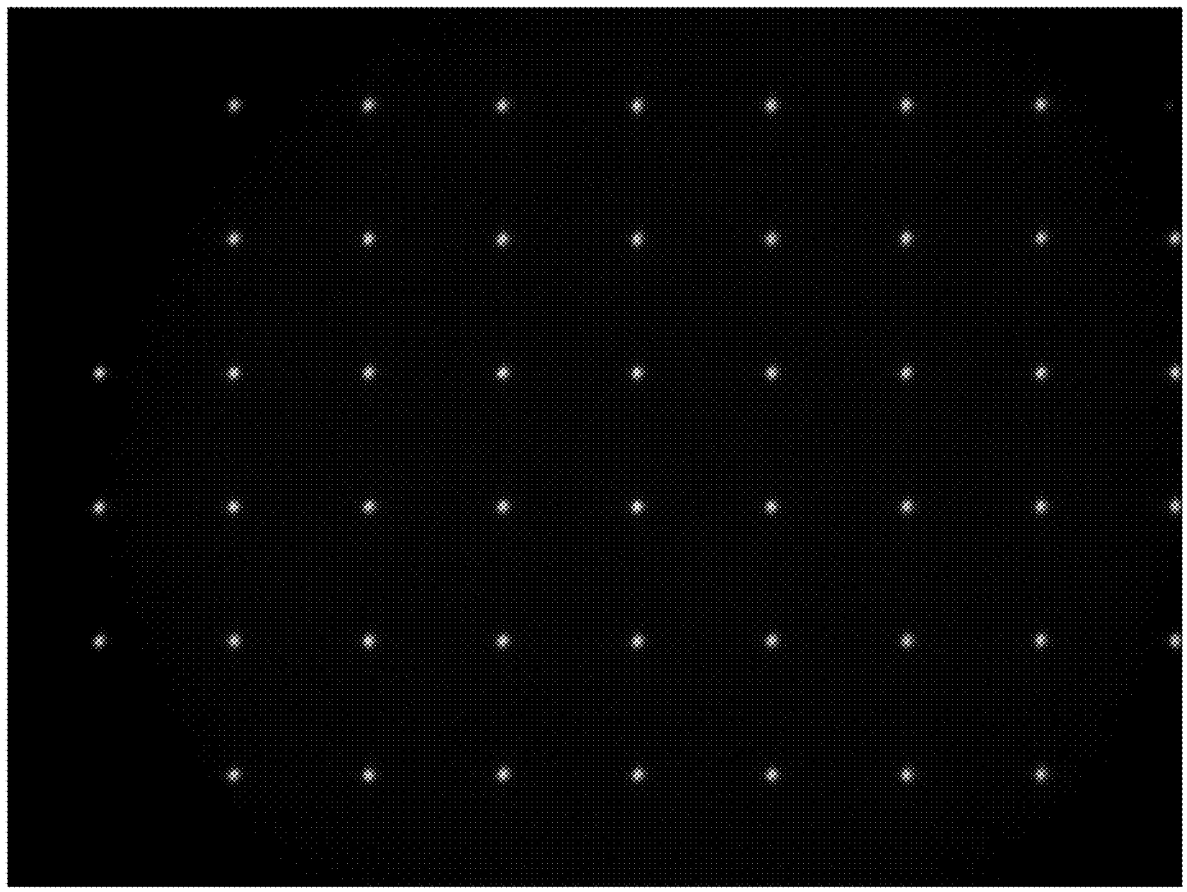
FIG. 7B is an illustration of a portion of image sensor data that might be generated in an exemplary embodiment.
Figure 7C:
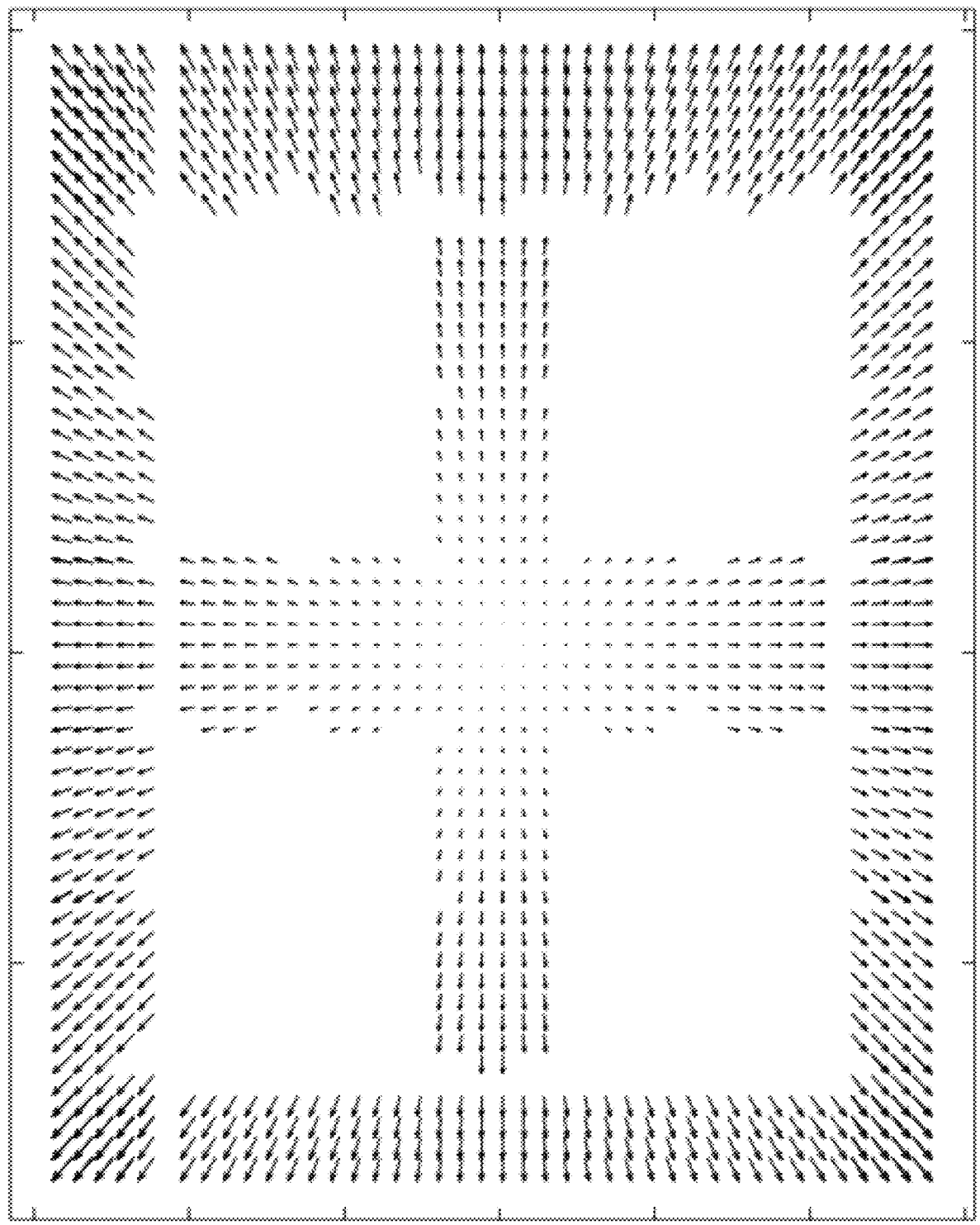
FIG. 7C is a plot illustrating registration error variation of a spatial light modulator in an imprint field of an exemplary embodiment.

The determining coefficients process 600 may include a measuring step S614 of the processor 140 receiving an image $I_{sensor}$ from the actinic radiation sensor 143 of the test exposure pattern produced by the spatial light modulator 448. In an embodiment, the test exposure pattern measured by the spatial light modulator 448 has passed through a template 108, wherein the shaping surface 112 is within 200 nm of the actinic radiation sensor 143. In an embodiment, a test fluid is placed between the shaping surface 112 and the actinic radiation sensor 143. The test fluid protects the shaping surface 112 while also having a refractive index that is close to the refractive index of the formable material 124 at the wavelength of the test exposure pattern. The test modulation map $M_T$ and the sensor image $I_{sensor}$ may include multiple maps and multiple images that are taken in series. The processor 140 may correlate individual elements of the test modulation map $M_T$ with individual pixels of the sensor image $I_{sensor}$. There may be a plurality of sensor image pixels that are correlated with may an individual element of the test modulation map $M_T$. This correlation may then be used by the processor 140 during the coefficient determination step S516 to determine the set of distortion coefficients D of the distortion model f. Determining the set of distortion coefficients D may include fitting the distortion model f to the correlation data between the test modulation map $M_T$ and the image $I_{sensor}$. FIG. 7B is an example of a portion of an exemplary sensor image $I_{sensor}$. The distortion model f describes the relationship between the desired locations ($x_d$, $y_d$) at the plane of the sensor/substrate corresponding to the modulation map and the actual locations ($x_a$, $y_a$) at the plane of the sensor/substrate. The desired locations ($x_d$, $y_d$) may be obtained from an optical simulation or can be the locations based on a previously obtained registration map. The desired locations ($x_d$, $y_d$) are a list of locations or a matrix representing desired locations. The desired locations ($x_d$, $y_d$) represent positions within a typical imprint field which an operator desires the SLM 448 to supply actinic radiation during the curing step S308. FIG. 7C is an illustration of position variation across the imprint field which is an example of measured distortions of the optical transmission system used to guide actinic radiation from the SLM 448 to the substrate surface 130.

The actinic radiation sensor 143 may include an image sensor such as CCD sensor array or a CMOS sensor array which may be made of a silicon or some other suitable semiconductor material. The image sensor is any suitable sensor that can produce an image (for example a digital image) that is a spatial representation of actinic radiation incident on the image sensor. The actinic radiation sensor 143 may also include a neutral density filter. The actinic radiation sensor 143 may also include one or more optical components which focus the actinic radiation at an object plane that is coplanar with the substrate surface 130 to an imaging plane that is at the surface of the image sensor. In an alternative embodiment, the sensing plane of the radiation sensor is not coplanar with the substrate surface and the SLM and one or more optical components are translated from exposure position to a measurement position. In the exposure position, there is an exposure optical distance (sum of distances weighted by refractive index) that is from an optical surface of the components being translated to the substrate surface 130. In the measurement position, there is a measurement optical distance that is from an optical surface of the components being translated to the sensing surface of the actinic radiation sensor 143. In an alternative embodiment, the sensing plane of the radiation sensor is not coplanar with the substrate surface and an optical simulation is used to compensate for the measurement error associated with lack of coplanarity.

Error Model

Information from the test modulation map $M_T$ includes a set of expected (desired) intensity center locations ($x_d$, $y_d$) on the formable material/substrate plane (substrate surface 130) for the pixels of the SLM that turned ON in the modulation map $M_T$. While the image $I_{sensor}$ can be used to generate a set $I_{actual}$ of actual intensity center locations ($x_a$, $y_a$) for the same pixels. Both sets of above locations are in the field coordinate system (field center as the origin). A distortion model f may be fitted to the modulation map $M_T$ and the set of actual intensity center locations $I_{actual}$. The distortion Equation (1) below is an example of such a distortion model f.

$$f(d_1, d_2, d_3, d_4) = \begin{cases} x_a = x_d(1 + d_1 r^2 + d_2 r^4) + 2d_3 x_d y_d + d_4(r^2 + 2x_d^2) \\ y_a = y_d(1 + d_1 r^2 + d_2 r^4) + 2d_4 x_d y_d + d_3(r^2 + 2y_d^2) \\ r^2 = x_d^2 + y_d^2 \end{cases} \quad (1)$$

The distortion model f can be characterized by a set of distortion coefficients D (f(D)). For example the set of distortion coefficients may include: a first radial distortion coefficient $d_1$; a second radial distortion coefficient $d_2$; a first tangential distortion coefficient $d_3$; and a second tangential distortion coefficient $d_4$ (D={$d_1$; $d_2$; $d_3$; $d_4$}). In the distortion model f given above the coordinates ($x_a$, $y_a$, $x_d$, $y_d$) are all relative to the center of the mesa 110. The distortion model f in equation (1) is an exemplary distortion model and other types of distortion models could also be used to model the registration errors (e.g., Zernike polynomials). The distortion model f may also include a global shift component which is removed from the model before the analysis is performed. The actinic radiation sensor 143 may be exposed to actinic radiation modulated with the modulation map $M_T$ at regular intervals (which can be used to describe how the optical system performance varies over time), while initially setting up the equipment, after replacing a component in the optics stack or any other maintenance activity that can significantly affect the optics stack and the set of distortion coefficients D generated based on the set of actual intensity center locations $I_{actual}$ from that exposure. These regular intervals may be at least twice a year.

Modulation Map Generation Method

Figure 7D:
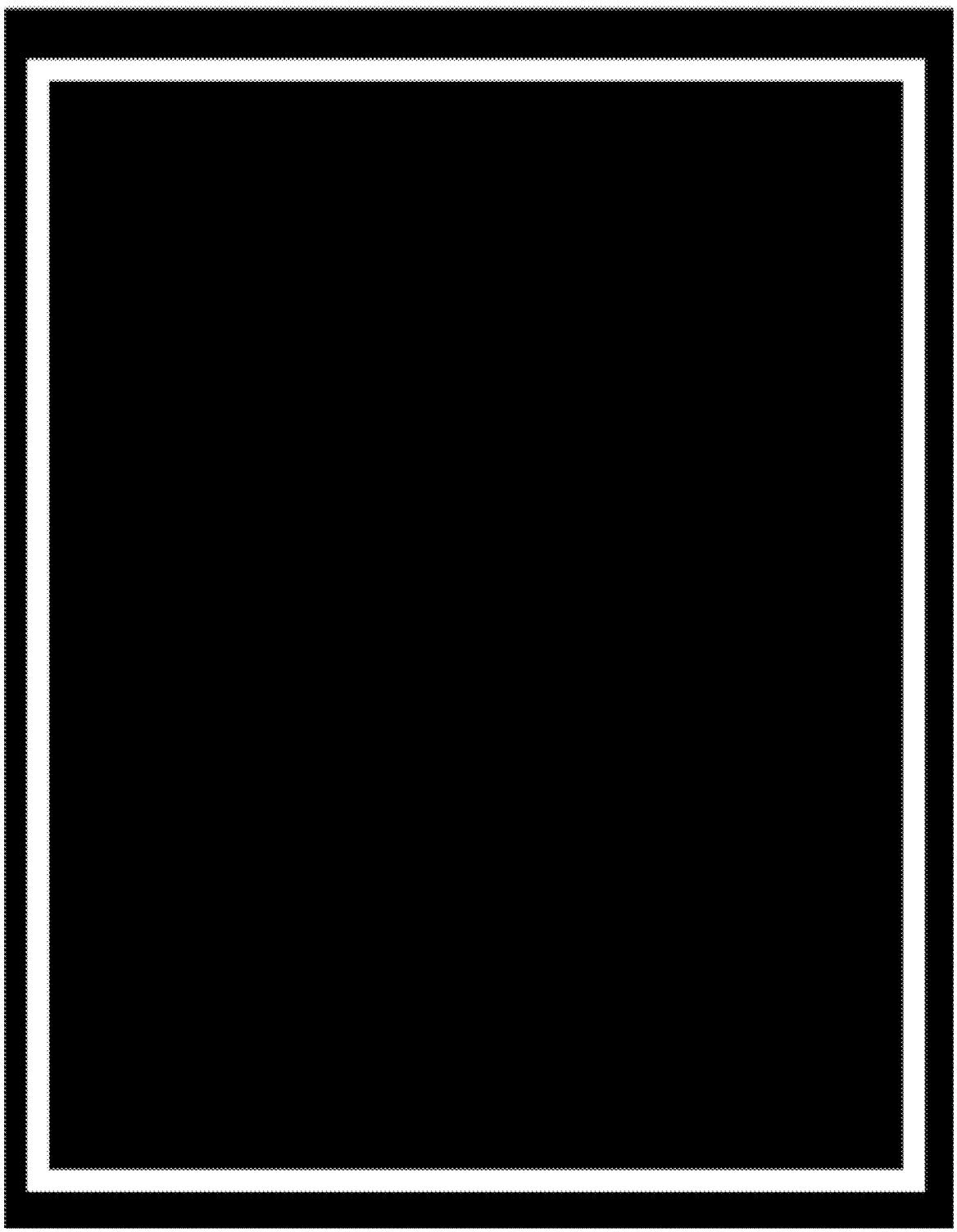
FIG. 7D is a plot illustrating the desired modulation pattern which may be generated for an exemplary embodiment.

An embodiment may include a modulation map generation method 800 that is used to generate the modulation map for the spatial light modulator used by the shaping system 300. Once the set of distortion coefficients D are determined by fitting the distortion model f to the test modulation map $M_T$ and the image $I_{sensor}$, these distortion coefficients can be used as part of the modulation map generation method 800 that is used to generate a final modulation map MF that is used when shaping formable material on a substrate. The modulation map generation method 800 may include a receiving step S802 of the processor 140 receiving a desired modulation map $M_0$ (target light pattern) as illustrated in FIG. 7D that represents the desired dosage pattern that the SLM 448 will provide to the formable material 124. The desired modulation map $M_0$ may be an array of binary values indicating a desired state of each pixel in the SLM 448, each element in the array associated with a desired or expected exposure position in an imprint field. The desired modulation map $M_0$ may be an array of values that represent a fraction of a maximum dosage associated with each pixel in the SLM 448, each element in the array associated with a desired or expected exposure position in an imprint field. The desired modulation map $M_0$ may be a list of positions that represent a desired or expected exposure position in an imprint field. The desired modulation map $M_0$ may have a frame like shape in which an outer frame edge is substantially similar to the shape of the mesa 110. An inner frame edge of the frame like shape may be inset by a constant width from the outer frame edge. In an embodiment, an inner frame edge of the frame like shape may be inset from the outer frame edge by a width that varies depending on the edge.

The modulation map generation method 800 may include an intermediary map generation step S804 in which the processor 140 applies an inversion of the distortion model $f^{-1}$ and the set of distortion coefficients D to the desired modulation map $M_0$ to obtain an intermediary modulation map $M_1$. Well known analytical and numerical techniques may be used to perform and apply the inversion of the distortion model $f^{-1}$ on the desired modulation map $M_0$ to obtain the intermediary modulation map $M_1$. The inversion of the distortion model $f^{-1}$ may be done numerically using any of the numerical solvers and/or optimization methods such as Newton-Raphson method, Trust-region, Levenberg-Marquardt Method, etc. The intermediary modulation map $M_1$ may have a position resolution that is greater than the resolution of the SLM 448.

Figure 7E:
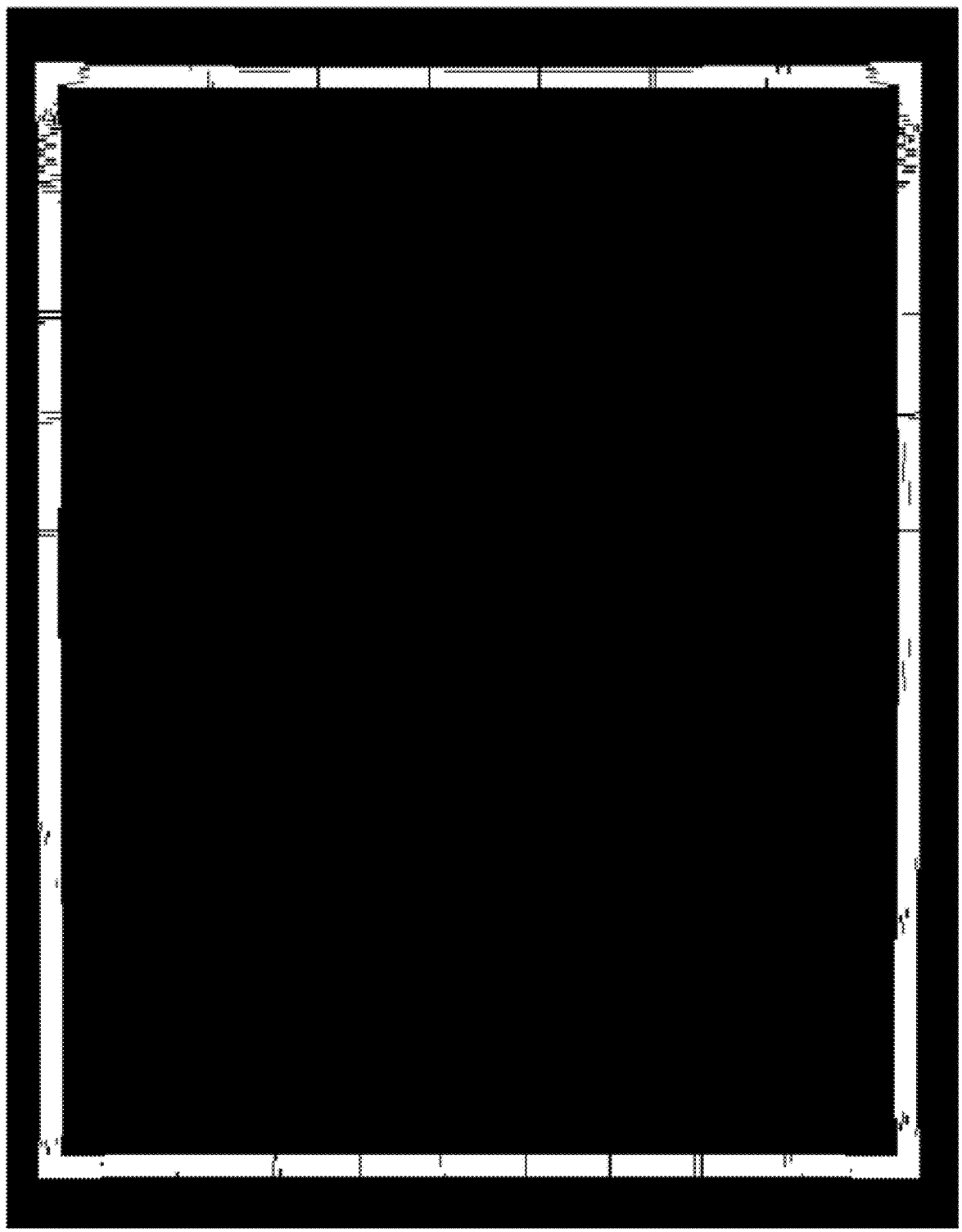
FIG. 7E is a plot illustrating a pixelated intermediary modulation pattern impact which may be generated in an exemplary embodiment.

The modulation map generation method 800 may include a pixelization step S806. The pixelization step S806 generate a pixelated intermediary modulation map $M_2$ for the SLM 448 including a plurality of pixels as illustrated in FIG. 7E. The intermediary modulation map $M_1$ may have pixel locations that do not exactly correspond to the pixel locations on the SLM 448. The pixelization step S806 generates a new modulation map with pixel locations that are centered on the pixel locations of the SLM 448. The pixelization step S806 may include snapping pixel locations of the intermediary modulation map $M_1$ to the nearest center of the nearest modulation element of the SLM 448. These steps S804 and S806 inevitably produce a pixelated intermediary modulation map $M_2$ that includes some discontinuities such that the integrity of the original pattern is compromised as illustrated in FIG. 7E. The processor 140 may store the pixelated intermediary map $M_2$ in memory 142.

Figure 7F:
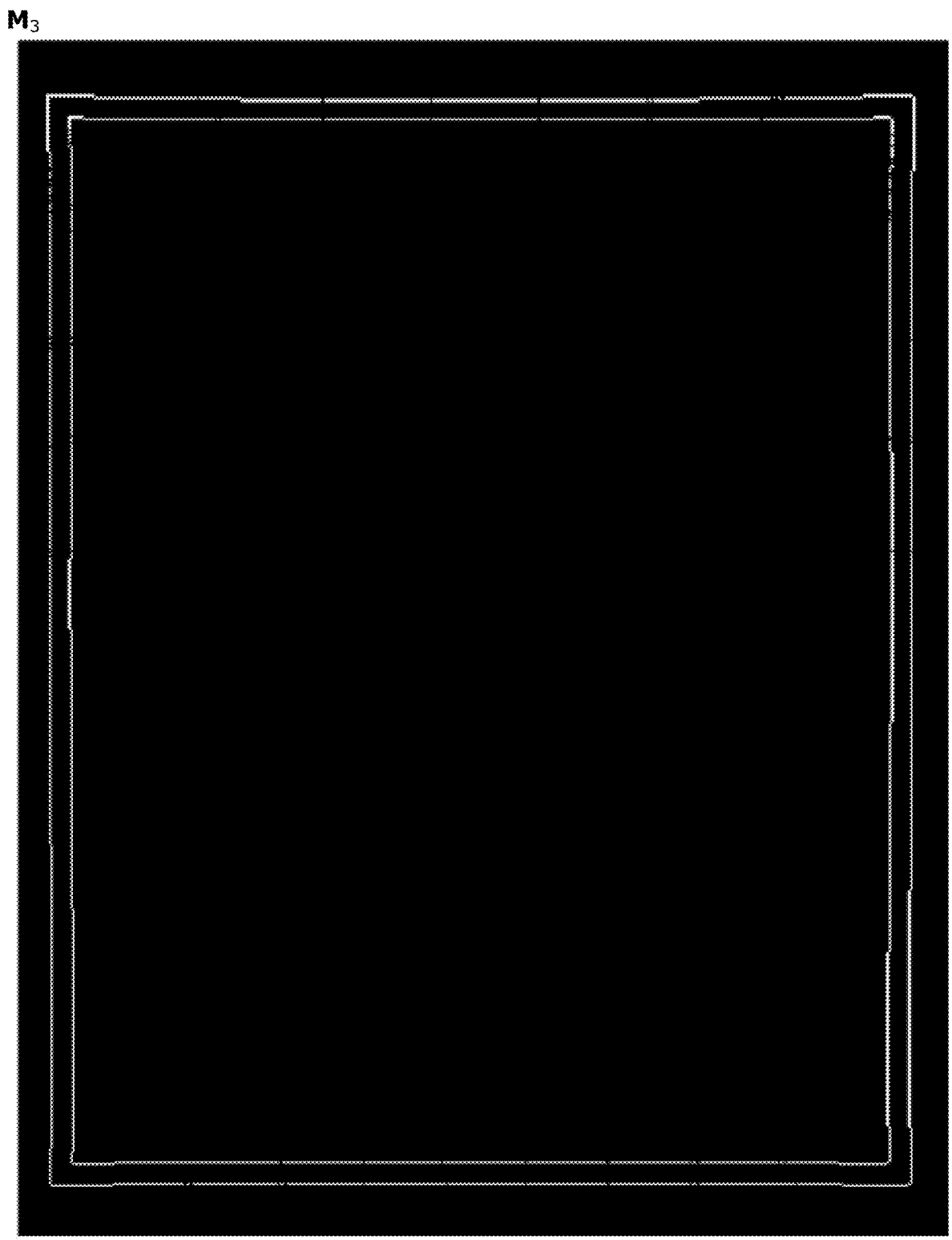
FIG. 7F is a plot illustrating an edge image which may be generated in an exemplary embodiment.
Figure 7G:
FIG. 7G is a plot illustrating a final modulation map which may be generated in an exemplary embodiment.

The modulation map generation process 800 may include a receiving step S808 of receiving the pixelated intermediary map $M_2$ in which the processor 140 receives the pixelated intermediary map $M_2$ from memory 142 which may be stored as an image file. The modulation map generation process 900 may include a final map generation step S810. The final map generation step S810 may make use of standard image manipulation techniques to fill in these discontinuities to produce a final modulation map $M_4$ as illustrated in FIG. 7G for the SLM 448. A rules/heuristic approach may be used to ensure that the continuity and integrity of the desired modulation map $M_0$ is maintained and there are no discontinuities including holes in the final modulation map $M_4$. The modulation map generation process 900 may include supplying the final modulation map $M_4$ to the SLM 448 in a step S812. The shaping system 100 will then control the SLM 448 using the final modulation map $M_4$ to expose the edges of the imprint field to a frame like illumination pattern during the shaping process 300 that has been corrected for any distortions in the optical system.

Applying the distortion model f to the final modulation map $M_4$ will produce a first predicted light intensity map on the illuminated target. Applying the distortion model f to the pixelated intermediary map $M_2$ will produce a second predicted light intensity map on an illuminated target. The applicant has found that the first predicted light intensity map generated from the final modulation map $M_4$ is closer to the desired modulation map $M_0$ than the second predicted light intensity map generated from the pixelated intermediary map $M_2$. In an embodiment, closer in the present context means a suitable metric is used to measure the quality of fit between the predicted light intensity map and the desired modulation map $M_0$. One example of a quality of fit is a sum of the squared residuals between the pixel locations in each map. Another example of the quality of fit is a difference between a number of holes in each map. Another example of a quality of fits is to represent edges of the map by a set of lines and using a least squares approximation to compare these lines.

Figure 8A:
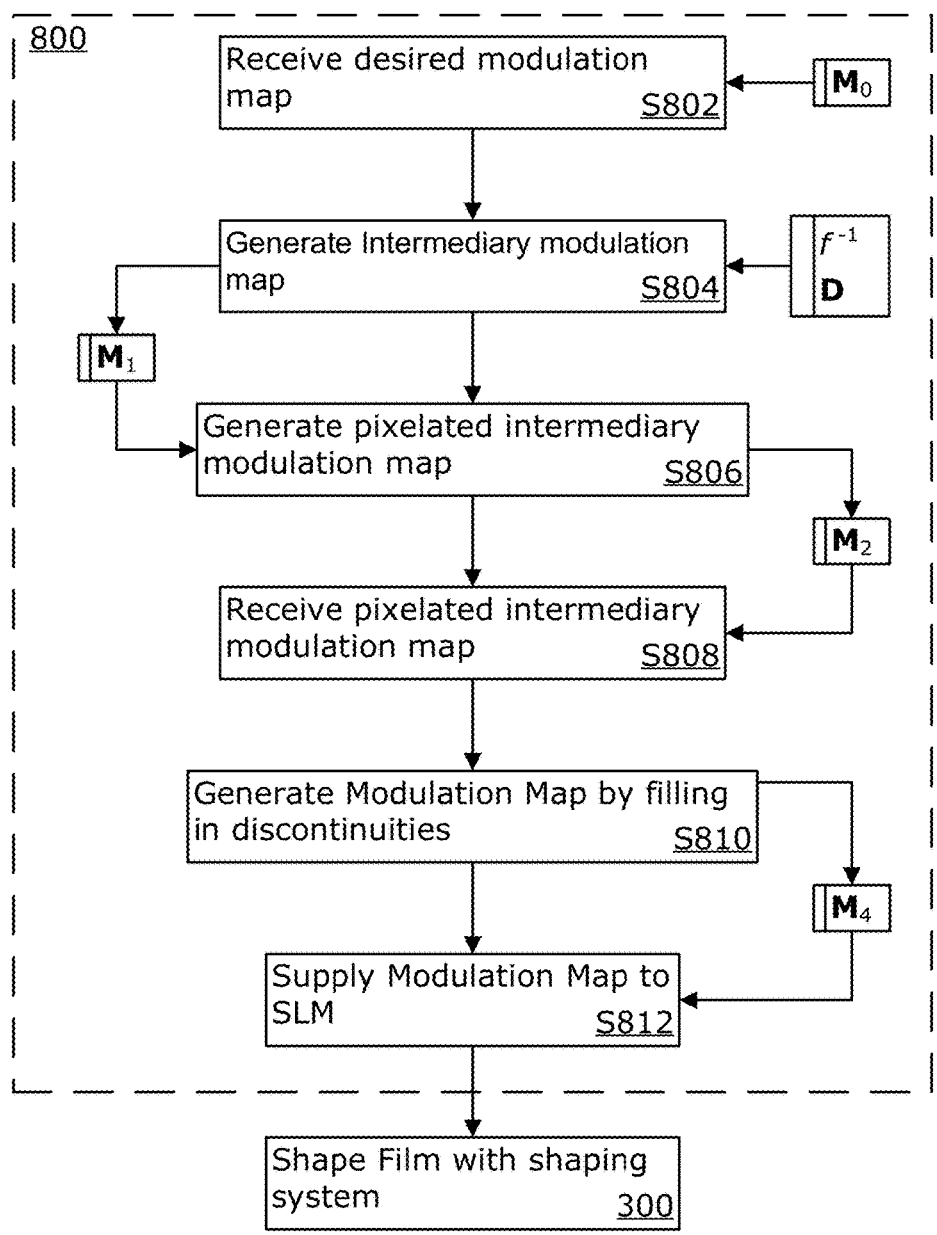
FIGS. 8A-B are flowcharts illustrating modulation map generation method as used in an embodiment.
Figure 8B:
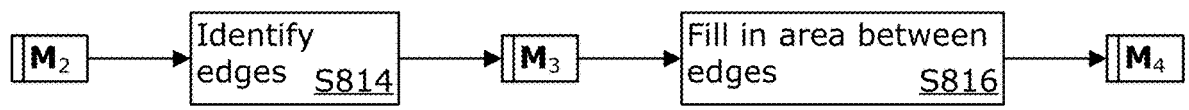

The final map generation step S810 may include an edge identification step S814 and a filling step S816 as illustrated in FIG. 8B. The edge identification step S814 may include using image analysis techniques for identifying internal and external edges in the pixelated intermediary map $M_2$ to generate an edge image $M_3$ as illustrate in FIG. 7F. This step may use any of the routinely used edge detection methods described in the literature including Sobel edge detection, Prewitt method, Roberts method, Canny method and so on. The edge image $M_3$ only includes pixels that are snapped to the grid of the SLM 448. The filling step S816 may include: a first connecting step of connecting the external edges to form a continuous outer frame; a second connecting step of connecting the internal edges to form a continuous inner frame like edge; and a filling step of filling in all of the pixels between the continuous outer frame and continuous inner frame. In an embodiment, these could be combined in a single algorithm or step. The filling step S816 may include a filtering step which is used to close the discontinuities in the internal and external edges to form a set of filtered edges. This filtering step may include a morphological closing (image processing technique for removing of small holes in an image) of the edge image $M_3$ using a structuring element (e.g., square, disk, cross, etc.) of suitable size e.g., a disk of radius 2, 3, 5, or 7 pixels. The filling step S816 may also include a step of filling in the pixels between the filtered internal and external edges. The filling step S816 only generates pixels that are on the grid of the SLM 448. In an alternative embodiment, instead of performing the edge detection steps, the filtering step could directly be used on $M_2$. This may be computationally more expensive as the filtering step now not only has to fill the discontinuities in the edges of the map but also fill the discontinuities in the interior between the inner and outer boundaries of the frame.

Figure 9A:
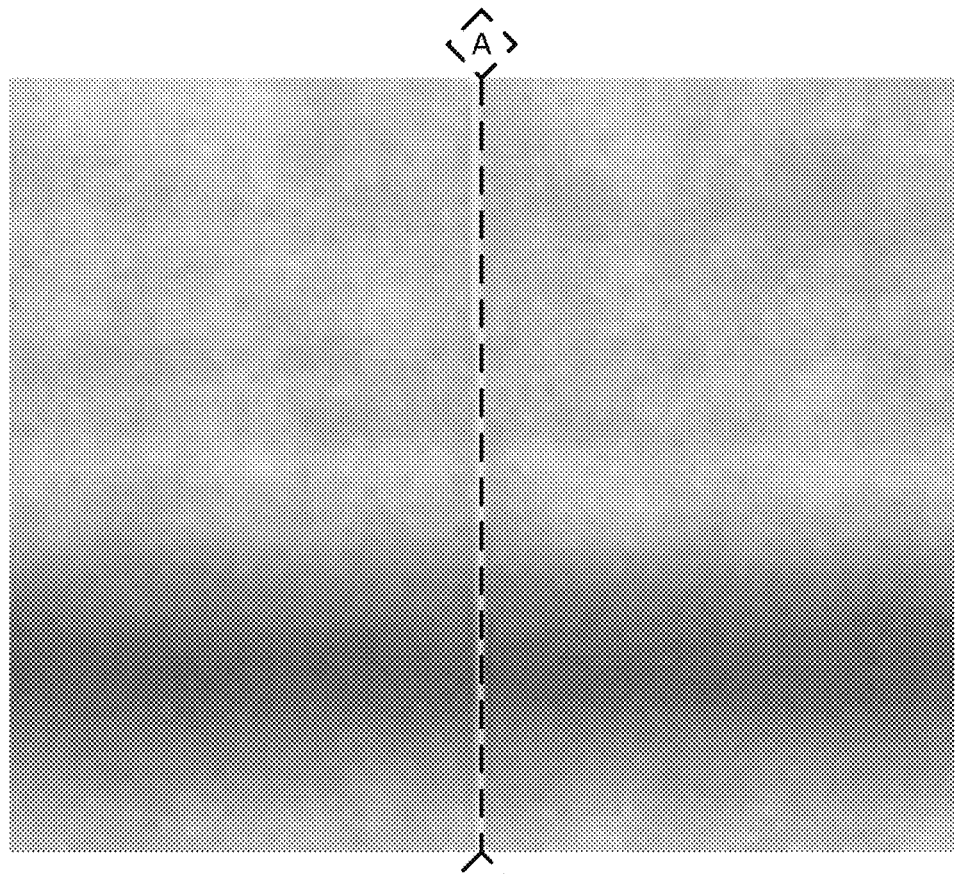
FIG. 9A is an image of actinic radiation transmitted through the template near a mesa sidewall.
Figure 9B:
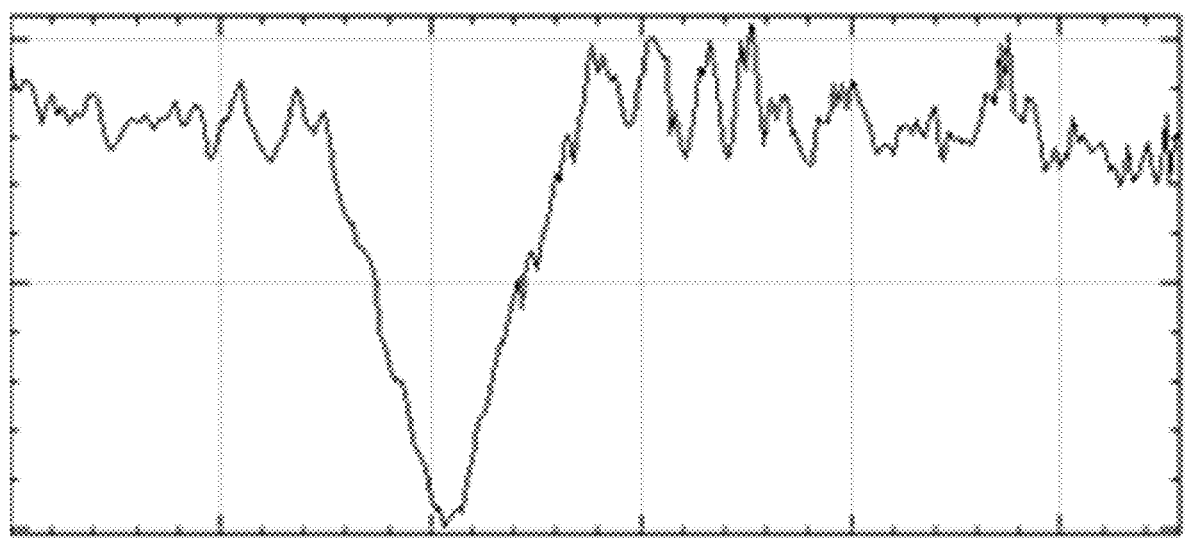
FIG. 9B is a chart illustrating an intensity of radiation in a cross-section crossing the mesa sidewall.

Another important feature to speed up the registration procedure and determining the edge pixels on the DMD pattern is to observe the variation in light intensity detected by the actinic radiation sensor 143 close to the mesa sidewalls 246. This variation in light intensity observed is due to the curved template geometry close to the mesa edge that directs/refracts the light at a different location causing a region of low intensity. An example of this effect can be seen in the image illustrated in FIG. 9A as observed by the actinic radiation sensor 143. FIG. 9B is a chart showing the measured intensity along line A-A in FIG. 9A.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. A method comprising:
   receiving, with a processor, a pixelated intermediate map for a spatial light modulator including a plurality of pixels based on a distortion model and a target light pattern, wherein the pixelated intermediate map has discontinuities;
   generating, with the processor, a modulation map for the spatial light modulator by filling in the discontinuities in the pixelated intermediate map, wherein both the modulation map and the pixelated intermediate map are arrays, wherein each element in each of the arrays of the modulation map and the pixelated intermediate map is respectively associated with a single position in an imprint field;
   wherein a first predicted light intensity map on an illuminated target produced by the modulation map is a closer approximation of the target light pattern than a second predicted light intensity map on the illuminated target produced by the pixelated intermediate map;
   controlling each of the plurality of pixels of the spatial light modulator, using the modulation map that was generated with the processor to be in a state that guides actinic radiation relative to mesa sidewalls of a template to illuminate formable material in the imprint field; and
   illuminating the formable material in the imprint field with the actinic radiation from the spatial light modulator controlled by the modulation map in which the discontinuities in the pixelated intermediate map are filled in.

2. The method of claim 1, wherein generating the modulation map comprises:
   generating, with the processor, edges which describe perimeters of the pixelated intermediate map; and
   filling, with the processor, in an area between the edges.

3. The method of claim 1, further comprising generating the pixelated intermediate map by:
   receiving, with the processor, the target light pattern;
   applying, with the processor, an inverse of the distortion model to the target light pattern to generate an intermediate pattern; and
   pixelating and snapping to a grid of the intermediate pattern to generate the pixelated intermediate map, wherein the pixelating and snapping to the grid generates the discontinuities which are then filled in to generate the modulation map.

4. The method of claim 3, wherein the target light pattern is an array of values, each value in the array of values is associated with a modulation element of the spatial light modulator.

5. The method of claim 4, wherein the each value in the array of values is a binary value.

6. The method of claim 3, wherein the target light pattern does not include the discontinuities.

7. The method of claim 1, further comprising determining a plurality of distortion coefficients of the distortion model by:
   measuring a test exposure pattern produced by a test modulation map produced by the spatial light modulator; and
   fitting, with the processor, the exposure pattern to the distortion model.

8. The method of claim 7, wherein measuring the exposure pattern comprises:
   exposing a sensor on a nanoimprint lithography tool to the test exposure pattern produced by the spatial light modulator.

9. The method of claim 7, wherein measuring the exposure pattern comprises:
   exposing formable material between the template and a test substrate to the test exposure pattern produced by the spatial light modulator to produce a cured film on the substrate; and
   measuring the cured film on the test substrate.

10. The method of claim 1, wherein generating the modulation map further comprises:
    identifying, with the processor, the discontinuities in the pixelated intermediate map; and
    setting pixels in the pixelated intermediate map, with the processor, to a state which supplies actinic radiation in the discontinuities.

11. The method of claim 1, wherein generating the modulation map further comprises:
    identifying, with the processor, the discontinuities in the pixelated intermediate map; and
    adding pixels to the pixelated intermediate map, with the processor, in the discontinuities.

12. The method of claim 1, further comprising:
    bringing a shaping surface into contact with the formable material on a substrate;
    illuminating the shaping surface with the spatial light modulator based on the modulation map to form a cured film on the substrate; and
    separating the shaping surface from the cured film.

13. A method of manufacturing an article, from the substrate on the cured film that was shaped according to the method of claim 12, further comprising:
    processing the substrate with the cured film; and
    forming the article from the substrate with the cured film.

14. The method of claim 1, wherein the target light pattern has a frame shape.

15. A method comprising:
    receiving, with a processor, a pixelated intermediate map for a spatial light modulator including a plurality of pixels based on a distortion model and a target light pattern, wherein the pixelated intermediate map has discontinuities;
    wherein the distortion model is:

$$f(d_1, d_2, d_3, d_4) = \begin{cases} x_a = x_d(1 + d_1 r^2 + d_2 r^4) + 2d_3 x_d y_d + d_4(r^2 + 2x_d^2) \\ y_a = y_d(1 + d_1 r^2 + d_2 r^4) + 2d_4 x_d y_d + d_3(r^2 + 2y_d^2) \\ r^2 = x_d^2 + y_d^2 \end{cases}$$

wherein $x_a$ is an actual x-coordinate of the distortion model;
   wherein $y_a$ is an actual y-coordinate of the distortion model;
   wherein $x_a$ is a desired x-coordinate of the distortion model;
   wherein $y_a$ is a desired y-coordinate of the distortion model; and
   wherein $d_1$; $d_2$; $d_3$; and $d_4$ are distortion coefficients of the distortion model;
   generating, with the processor, a modulation map for the spatial light modulator by filling in the discontinuities in the pixelated intermediate map;
   wherein a first predicted light intensity map on an illuminated target produced by the modulation map is a closer approximation of the target light pattern than a second predicted light intensity map on the illuminated target produced by the pixelated intermediate map;

controlling each of the plurality of pixels of the spatial light modulator, using the modulation map that was generated with the processor to be in a state that guides actinic radiation through a template to illuminate formable material in the imprint field; and illuminating the formable material in the imprint field with the actinic radiation from the spatial light modulator controlled by the modulation map in which the discontinuities in the pixelated intermediate map are filled in.

16. A system comprising:

a memory; and a processor configured to:

receive a pixelated intermediate map for a spatial light modulator including a plurality of pixels based on a distortion model and a target light pattern, wherein the pixelated intermediate map has discontinuities;

generate a modulation map for the spatial light modulator by filling in the discontinuities in the pixelated intermediate map, wherein both the modulation map and the pixelated intermediate map are arrays, wherein each element in each of the arrays of the modulation map and the pixelated intermediate map is respectively associated with a single position in an imprint field;

wherein a first predicted light intensity map on an illuminated target produced by the modulation map is a closer approximation of the target light pattern than a second predicted light intensity map on the illuminated target produced by the pixelated intermediate map; and control each of the plurality of pixels of the spatial light modulator, using the modulation map that was generated with the processor to be in a state that guides actinic radiation relative to mesa sidewalls of a template to illuminate formable material in the imprint field;

and illuminating the formable material in the imprint field with the actinic radiation from the spatial light modulator controlled by the modulation map in which the discontinuities in the pixelated intermediate map are filled in.

17. The system of claim 16 further comprises a nanoimprint lithography system including the spatial light modulator, wherein the nanoimprint lithography system comprises:

a substrate chuck for holding a substrate;

an actinic radiation sensor that is configured to supply information that is used by the processor to generate the pixelated intermediate map;

a substrate stage for holding the substrate chuck and the actinic radiation sensor;

a template chuck for holding the template; and a curing system including the spatial light modulator, wherein the spatial light modulator is configured to illuminate the formable material in contact with both the substrate and the template.

* * * * *